(12) United States Patent
Ganesan et al.

(10) Patent No.: US 12,206,478 B2
(45) Date of Patent: Jan. 21, 2025

(54) TRANSMITTING SIDELINK CSI USING AN UPLINK CHANNEL

(71) Applicant: Lenovo (Singapore) PTE. LTD., New Tech Park (SG)

(72) Inventors: Karthikeyan Ganesan, Kronberg im Taunus (DE); Prateek Basu Mallick, Dreieich (DE); Joachim Loehr, Wiesbaden (DE); Ravi Kuchibhotla, Chicago, IL (US)

(73) Assignee: Lenovo (Singapore) Pte. Ltd., New Tech Park, Singapore (SG)

( * ) Notice: Subject to any disclaimer, the term of this patent is extended or adjusted under 35 U.S.C. 154(b) by 274 days.

(21) Appl. No.: 17/792,102

(22) PCT Filed: Jan. 11, 2021

(86) PCT No.: PCT/IB2021/050173
§ 371 (c)(1),
(2) Date: Jul. 11, 2022

(87) PCT Pub. No.: WO2021/140494
PCT Pub. Date: Jul. 15, 2021

(65) Prior Publication Data
US 2023/0050238 A1 Feb. 16, 2023

Related U.S. Application Data

(60) Provisional application No. 62/959,835, filed on Jan. 10, 2020.

(51) Int. Cl.
*H04B 7/06* (2006.01)
*H04W 72/1263* (2023.01)
*H04W 72/23* (2023.01)

(52) U.S. Cl.
CPC ...... *H04B 7/0626* (2013.01); *H04W 72/1263* (2013.01); *H04W 72/23* (2023.01)

(58) Field of Classification Search
None
See application file for complete search history.

(56) References Cited

U.S. PATENT DOCUMENTS

| 2014/0233453 | A1 | 8/2014 | Speight et al. |
| 2017/0208638 | A1 | 7/2017 | Baghel et al. |
| 2022/0201528 | A1* | 6/2022 | Shin ............ H04L 5/0053 |

(Continued)

OTHER PUBLICATIONS

LG Electronics Inc., Discussion on measurement and report in NR SL, 3GPP TSG RAN WG2 Meeting #108 R2-1915517, Nov. 18-22, 2019, p. 1-6.

(Continued)

*Primary Examiner* — Hong S Cho
(74) *Attorney, Agent, or Firm* — Kunzler Bean & Adamson

(57) ABSTRACT

Apparatuses, methods, and systems are disclosed for transmitting SL CSI using an uplink channel. One apparatus includes a transceiver that receives a first SL-CSI value from a RX UE via one of a plurality of unicast links. The apparatus includes a processor that generates a SL-CSI report comprising the first SL-CSI value, wherein the first SL-CSI value is tagged with an identifier that identifies the RX UE. The processor controls the transceiver to transmit the SL-CSI report using an uplink channel.

19 Claims, 11 Drawing Sheets

(56) References Cited

U.S. PATENT DOCUMENTS

2022/0346118 A1* 10/2022 Wu .................... H04L 1/1825
2022/0416969 A1* 12/2022 Lee .................... H04L 1/0026

OTHER PUBLICATIONS

Futurewei, Views on sidelink enhancements in Rel-17, 3GPP TSG RAN Meeting #86 RP-192683, Dec. 9-12, 2019, p. 1-8.
LG Electronics, LS on signaling of sidelink RSRP and CSI between UEs, 3GPP TSG RAN WG1 #98bis R1-1911662, Oct. 14-20, 2019, p. 1-2.
RAN1, LS on signalling of sidelink RSRP and CSI between UEs, 3GPP TSG RAN WG1 #98bis R1-1911698, Oct. 14-20, 2019, p. 1-2.
PCT/IB2021/050173, "Notificaation of Transmittal of the International Search Report and the Written Opinion of the International Searching Authority, or the Declaration", May 19, 2021, pp. 1-21.

\* cited by examiner

_US 12,206,478 B2_

TRANSMITTING SIDELINK CSI USING AN UPLINK CHANNEL

CROSS-REFERENCE TO RELATED APPLICATIONS

This application claims priority to U.S. Provisional Patent Application No. 62/959,835 entitled "METHOD OF SIDE-LINK CSI REPORTING" and filed on Jan. 10, 2020 for Karthikeyan Ganesan, Prateek Basu Mallick, Joachim Loehr, and Ravi Kuchibhotla, which application is incorporated herein by reference.

FIELD

The subject matter disclosed herein relates generally to wireless communications and more particularly relates to reporting sidelink CSI, e.g., to a gNB or RAN node.

BACKGROUND

The following abbreviations are herewith defined, at least some of which are referred to within the following description: Third Generation Partnership Project ("3GPP"), Fifth Generation Core Network ("5GC"), Fifth Generation System ("5GS"), 5G QoS Indicator ("5QI"), Authentication, Authorization and Accounting ("AAA"), Positive-Acknowledgment ("ACK"), Application Function ("AF"), Access and Mobility Management Function ("AMF"), Access Point ("AP"), Application Programming Interface ("API"), Access Stratum ("AS"), Base Station ("BS"), Bandwidth Part ("BWP"), Code Block Group ("CBG"), Code Division Multiplexing ("CDM"), Code Division Multiple Access ("CDMA"), Control Element ("CE"), Core Network ("CN"), Control Plane ("CP"), Channel Quality Indicator ("CQI"), Channel State Information ("CSI"), CSI Reference Signal ("CSI-RS"), Downlink Control Information ("DCI"), Downlink ("DL"), Discontinuous Transmission ("DTX"), Evolved Node-B ("eNB"), Evolved Packet Core ("EPC"), Evolved Packet System ("EPS"), New Generation (i.e., 5G) Node-B ("gNB"), General Packet Radio Service ("GPRS"), Global System for Mobile Communications ("GSM"), Hybrid Automatic Repeat Request ("HARQ"), Home Subscriber Server ("HSS"), Identifier ("ID"), Information Element ("IE"), Layer-1 ("L1", also known as the Physical Layer), Layer-2 ("L2", also known as the Link Layer), Layer-3 ("L3", also known as the Network Layer), Logical Channel ("LCH"), LCH Prioritization ("LCP"), Long Term Evolution ("LTE"), Medium Access Control ("MAC"), MAC Control Element ("MAC CE"), Mobility Management Entity ("MME"), Negative-Acknowledgment ("NACK") or ("NAK"), Non-Access Stratum ("NAS"), Network Exposure Function ("NEF"), Network Slice Selection Assistance Information ("NSSAI", e.g., a vector value including one or more S-NSSAI values), New Radio ("NR", a 5G radio access technology; also referred to as "5G NR"), Packet Delay Budget ("PDB"), Physical Downlink Control Channel ("PDCCH"), Physical Downlink Shared Channel ("PDSCH"), Packet Data Unit ("PDU", used in connection with 'PDU Session'), Packet Data Network Gateway ("P-GW"), PC5 Link Identifier ("PLI"), Public Land Mobile Network ("PLMN"), Precoding Matrix Indicator ("PMI"), PC5 5QI ("PQI," corresponds to QoS for NR V2X communication over the PC5 interface), Physical Random Access Channel ("PRACH"), Physical Resource Block ("PRB"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), QoS Flow Indicator ("QFI"), Quality of Service ("QoS"), Random Access Channel ("RACH"), Radio Access Network ("RAN"), Radio Access Technology ("RAT"), Rank Indicator ("RI"), Radio Link Control ("RLC"), Radio Resource Control ("RRC"), Reference Signal ("RS"), Received Signal Received Power ("RSRP"), Received Signal Strength Indicator ("RSSI"), Receive ("RX"), Sidelink Control Information ("SCI"), Sidelink CSI RS ("S-CSI-RS"), Serving Gateway ("S-GW"), Signal-to-Interference-and-Noise Ratio ("SINR"), Sidelink ("SL"), Sidelink CSI ("SL-CSI"), Sidelink Reference Signal ("SL-RS"), Session Management ("SM"), Session Management Function ("SMF"), Single Network Slice Selection Assistance Information ("S-NSSAI"), Scheduling Request ("SR"), Sidelink Received Signal Received Power ("S-RSRP"), Transport Block ("TB"), Transmit ("TX"), Uplink Control Information ("UCI"), Unified Data Management ("UDM"), User Data Repository ("UDR"), User Entity/Equipment (Mobile Terminal) ("UE"), Uplink ("UL"), User Plane ("UP"), Universal Mobile Telecommunications System ("UMTS"), User Plane ("UP"), UMTS Terrestrial Radio Access Network ("U IRAN"), Vehicle-to-everything ("V2X", V2X communication encompasses both V2V and V2I), Vehicle-to-Infrastructure ("V2I"), Vehicle-to-Vehicle ("V2V"), a UE capable of vehicular communications using 3GPP protocols ("V2X UE"), and Worldwide Interoperability for Microwave Access ("WiMAX"). As used herein, "HARQ-ACK" refers to HARQ feedback may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, V2X CQI/RI (channel quality indicator/rank indicator) is reported from RX UE to TX UE for unicast via higher layer signaling. In some embodiments, a MAC CE is used to report CQI/RI from RX UE to TX UE. V2X communication allows vehicles to communicate with moving parts of the traffic system around them. Two resource allocation modes are used in LTE V2X communication which are also considered as a baseline for corresponding resource allocation modes in NR V2X communication.

BRIEF SUMMARY

Disclosed are procedures for transmitting SL CSI using an uplink channel Said procedures may be implemented by apparatus, systems, methods, or computer program products.

One method of a UE includes receiving a first SL-CSI value from a RX UE via one of a plurality of unicast links and generating a SL-CSI report containing the first SL-CSI value, where the first SL-CSI value is tagged with an identifier that identifies the RX UE. The first method includes transmitting a MAC CE to a RAN node using an uplink channel, the MAC CE containing the SL-CSI report.

Another method of a UE includes receiving a first SL-CSI value from a RX UE via one of a plurality of unicast links and generating a SL-CSI report comprising the first SL-CSI value, where the first SL-CSI value is tagged with an identifier that identifies the RX UE. The second method includes transmitting the SL-CSI report to a RAN node using a Layer-1 uplink ("L1 UL") control channel.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
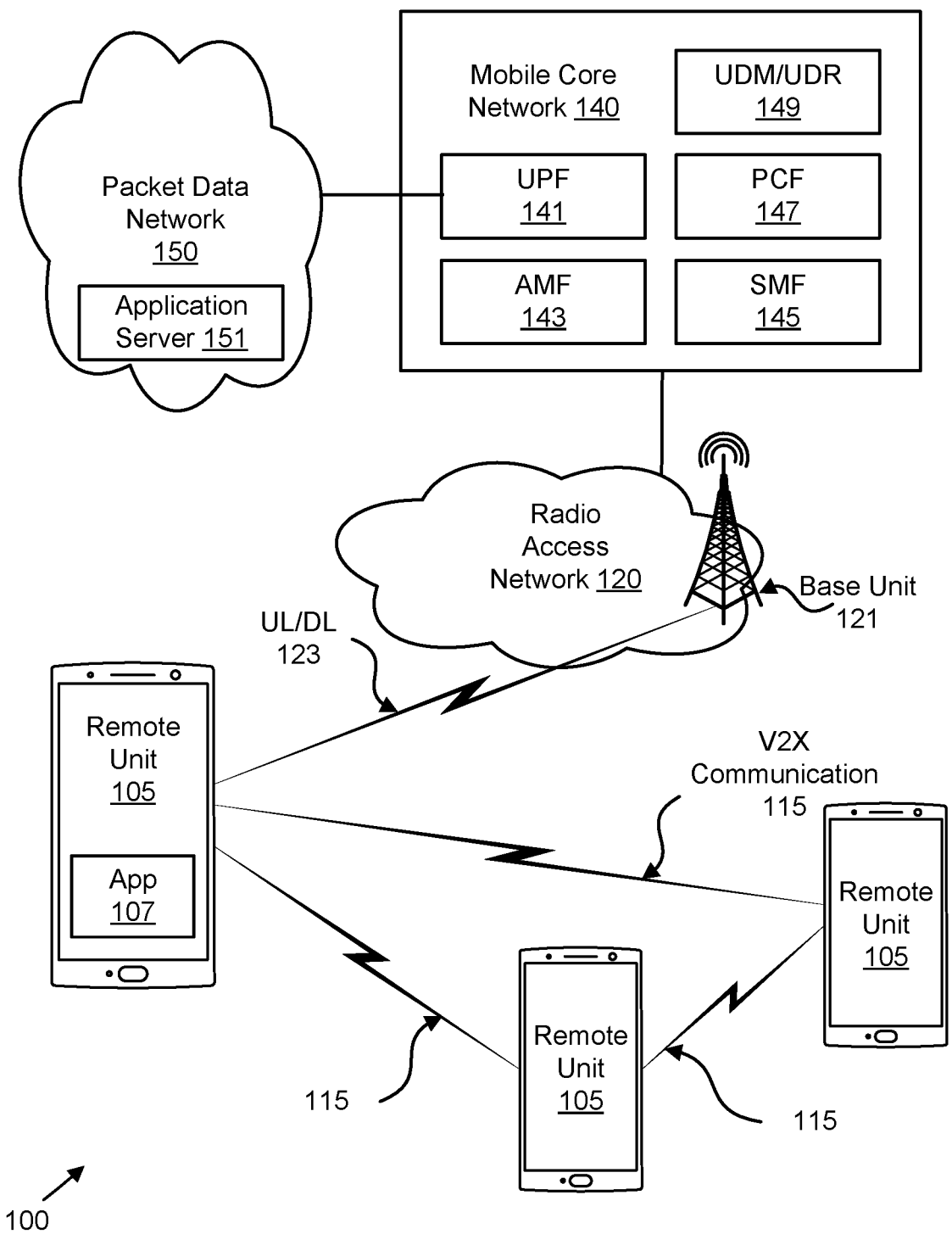
FIG. 1 is a block diagram illustrating one embodiment of a wireless communication system for transmitting SL CSI using an uplink channel.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for reporting SL-CSI, e.g., of UEs engaged in V2X communication. In some embodiments, a transmitting UE (TX UE) reports SL-CSI from plurality of the unicast links to a gNB. In certain embodiments, the TX UE reports SL-CSI for each unicast links is tagged with an additional field to report the SL unicast link ID or SL unicast destination ID, SL-CSI measurement configuration, SL BWP ID, SL carrier ID or panel ID, SL Slot number. SL-CSI reporting to gNB may be beneficial for the TX UE to report SL channel quality to the gNB so that the gNB scheduler is aware of the sideline channel and can schedule SL resources appropriately. SL CSI comprises of SL CQI, SL RI values, SL PMI and SL beam measurement reports. These solutions are discussed in greater detail below.

NR V2X communication may use one of the following SL resource allocation modes. In Mode-1, the RAN node (e.g., gNB) schedules SL resource(s) to be used by UE for SL transmission(s). One example of Mode-1 resource allocation is described in 3GPP TR 38.885, section 6.2.1. In Mode-2, the network does not schedule the SL resources; rather, the UE determines SL transmission resource(s) within SL resources configured by BS/network or pre-configured SL resources. As such, Mode-2 covers the cases of: a) the UE autonomously selecting SL resource for transmission; b) the UE being configured with NR configured grant (Type-1 like) for SL transmission; c) the UE scheduling SL transmissions of other UEs; and d) the UE assisting in SL resource selection for other UE(s), a functionality which may be part of any of the above cases.

In 3GPP Rel-16 standards for V2X, CQI/RI is reported from a RX UE to a TX UE for unicast via higher layer signaling. In certain embodiments, a MAC CE may be used to report CQI/RI from the RX UE to the TX UE. Additionally, the TX UE may report sidelink channel quality to the gNB so that the gNB scheduler is aware of the sidelink channel. As noted above, SL CSI reporting to gNB supports SL QoS monitoring and SL scheduling enhancement.

Discussed herein are solutions to report SL CSI to a gNB either via L1 signaling via PUCCH or higher layer signaling such as MAC CE or RRC signaling. Moreover, one TX UE may have multiple unicast links with multiple RX UEs and the reporting of SL CSI identifies a corresponding unicast link, as described in greater detail below. For the case of L1 signaling being used to send the SL CSI report to the gNB, the below solutions also provide timing of periodic PUCCH resource to prevent mis-alignment which may be caused by the TX UE receiving aperiodic SL-CSI report from RX UE using higher layer signaling such as MAC CE. For the case of higher layer signaling being used to report the SL CSI to gNB, the below solutions define MAC CE formats for carrying to carry SL CSI values in Uu signaling.

For reporting SL-CSI, currently (e.g., in Rel-16) SL-CSI is exchanged between the RX UE and TX UE, but not with the gNB. Thus, the gNB is not aware of the SL channels. However, information on SL channel condition may be valuable for the gNB scheduler for a Mode-1 scheduling. The present disclosure presents solutions for reporting SL-CSI to the gNB either using higher layer signaling—such as MAC CE or RRC signaling—or using L1 signaling via PUCCH.

In some embodiments, L1 signaling is used to report the SL-CSI report to gNB. However, the timing of periodic PUCCH resource may be mis-aligned because of TX UE receiving aperiodic SL-CSI report from RX UE using higher layer signaling such as MAC CE. Therefore, it is not trivial on how/when to trigger or request the UL PUSCH resource to do aperiodic SL-CSI reporting. In other embodiments, higher layer signaling is used to report the SL-CSI to gNB.

In addition, one TX UE may have multiple unicast links with RX UEs and the reporting of SL-CSI may take into account corresponding to a unicast link ID and gNB requires additional information apart from the CSI values to help associate the SL-CSI values to a SL carrier/BWP, PRB(s), panels, slot number, SL CSI-RS, etc. Because the SL CSI-RS is being transmitted along with the SL data, the gNB does not know when the CSI-RS was transmitted by the TX UE if the destination ID was selected by the TX UE itself.

Various solutions disclosed herein use higher layer signaling to report gNB on CSI reports received on the PC5 interface from RX UE(s). Such solutions enable gNB scheduler to be aware of the sidelink channel conditions. In addition, SL-CSI reporting helps it in SL QoS monitoring, predictions and thus enables/disables advanced SL QoS fulfillment. SL-CSI report received.

Various solutions disclosed herein enable TX UE to form MAC CE to report SL-CSI via UL signaling which contains SL link ID, SL BWP ID, panel ID to help associate SL-CSI reporting to particular SL link ID or destination ID (TX UE may have one or more unicast link with one or more RX UE(s)) and additional information fields to help associate SL-CSI report from TX UE.

The disclosed solutions also optimize the SL-CSI reporting procedures to reduce latency in transmitting SL-CSI report to gNB by requesting UL resources before the available of CSI report at the TX UE. Various solutions also optimize the overhead of CSI reporting to the gNB including CSI reports from multiple unicast links belonging to the same TX-RX UE pairs.

FIG. 1 depicts a wireless communication system 100 for transmitting SL CSI using an uplink channel for wireless devices communicating V2X messages 115, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 121 with which the remote unit 105 communicates using wireless communication links 123. Even though a specific number of remote units 105, base units 121, wireless communication links 123, RANs 120, and mobile core networks 140 are depicted in FIG. 1, one of skill in the art will recognize that any number of remote units 105, base units 121, wireless communication links 123, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. The PDU session represents a logical connection between the remote unit 105 and the UPF 141. In order to establish the PDU session, the remote unit 105 must be registered with the mobile core network. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 121 may be distributed over a geographic region. In certain embodiments, a base unit 121 may also be referred to as an access terminal, an access point ("AP"), a base, a base station ("BS"), a Node-B, an eNB, a gNB, a Home Node-B, a relay node, a RAN node, or by any other terminology used in the art. The base units 121 are generally part of a radio access network ("RAN"), such as the RAN 120, that may include one or more controllers communicably coupled to one or more corresponding base units 121. These and other elements of radio access network are not illustrated but are well known generally by those having ordinary skill in the art. The base units 121 connect to the mobile core network 140 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more user plane functions ("UPFs") 141. The mobile core network 140 also includes multiple control plane functions including, but not limited to, an Access and Mobility Management Function ("AMF") 143 that serves the RAN 120, a Session Management Function ("SMF") 145, a Policy Control Function ("PCF") 147, and a Unified Data Management function ("UDM") 149. In various embodiments, the mobile core network 140 may also include an Authentication Server Function ("AUSF"), a Network Repository Function ("NRF") (used by the various NFs to discover and communicate with each other over APIs), a Network Exposure Function ("NEF"), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. Each network slice includes a set of CP and/or UP network functions. A network instance may be identified by a S-NSSAI, while a set of network slices for which the remote unit 105 is authorized to use is identified by NSSAI. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the remote units 105 may communicate directly with each other (e.g., device-to-device communication) using V2X communication signals 125. Here, V2X transmissions may occur on V2X resources. As discussed above, a remote unit 105 may be provided with different V2X communication resources for different V2X modes. Mode-1 corresponds to a NR-based network-scheduled V2X communication mode. Mode-2 corresponds to an NR-based UE-scheduled V2X communication mode.

While FIG. 1 depicts components of a 5G RAN and a 5G core network, the described embodiments for transmitting SL CSI using an uplink channel apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term RAN node is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting serving cells/carriers being configured for sidelink communication, e.g., over PC5 interface.

Figure 2:
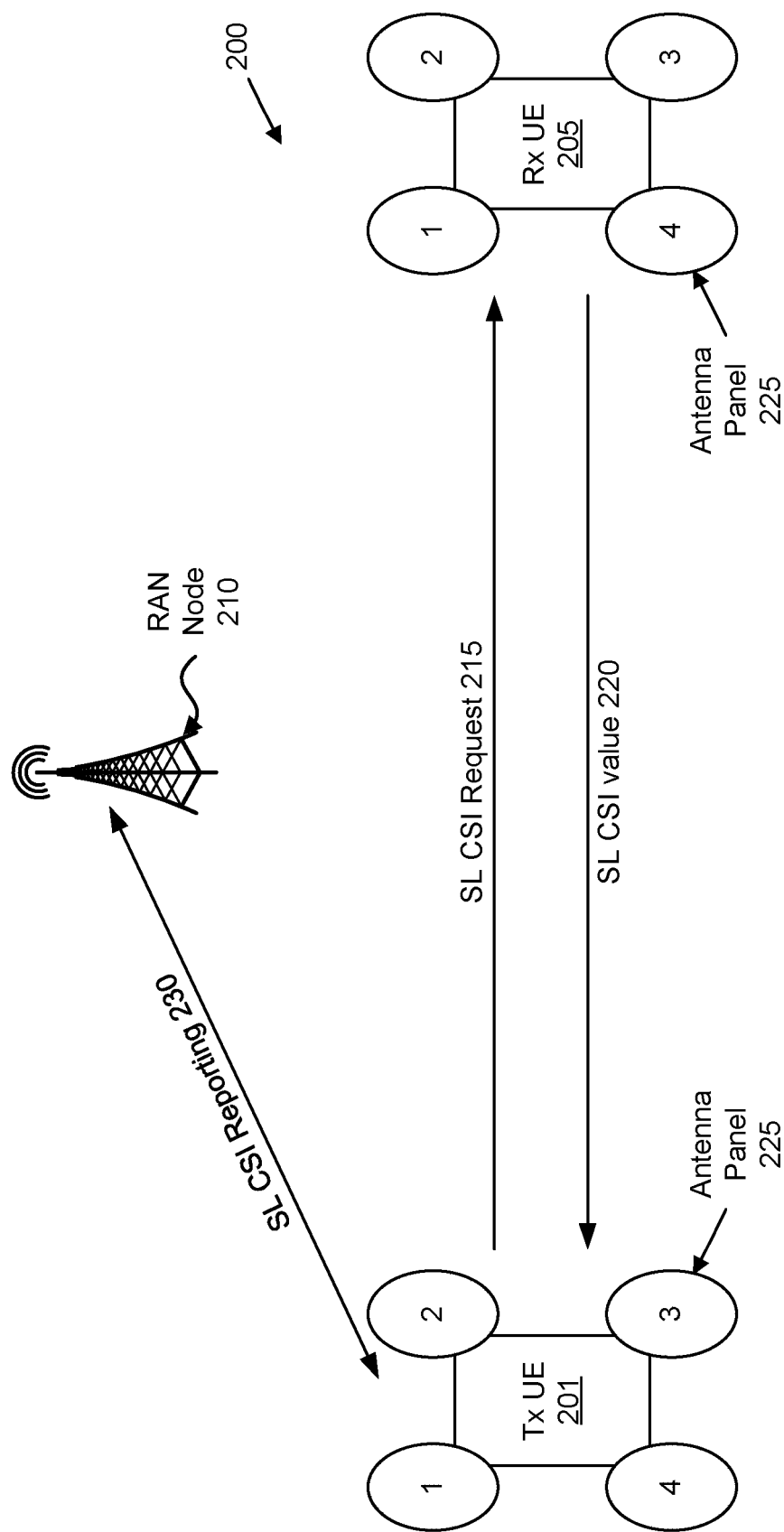
FIG. 2 is a diagram illustrating one embodiment of a network procedure for reporting SL-CSI to a RAN.

FIG. 2 depicts a procedure 200 for transmitting SL CSI using an uplink channel, according to embodiments of the disclosure. The procedure 200 may be implemented by a TX UE 201 that communicates with at least one RX UE 205 using sidelink communications. The TX UE 201 and RX UE 205 may be embodiments of the remote units 105, described above. While a single RX UE 205 is depicted for ease of illustration, in other embodiments the TX UE 201 may engage in sidelink communications with multiple RX UEs 205 concurrently. Moreover, at a later point in time the TX UE 201 and RX UE 205 may swap roles. Still further, the depicted TX UE 201 may itself be a receiving UE with respect to other SL UEs (not depicted).

In various embodiments, the TX UE 201 sends a SL-CSI request 215 to the RX UE 205. The RX UE 205 responds by sending a SL-CSI value 220 to the TX UE 201. Here, the SL-CSI value 220 is based on the physical layer measurements from RX UE 205 to TX UE 201. The TX UE 201 reports SL CSI 230 to the RAN node 210. Here, the RAN node 210 may be one implementation of the base unit 121, described above.

Regarding the SL CSI reporting 230, a MAC CE may be used to carry a SL-CSI report. In one embodiment, the MAC CE is generated only when there is UL data to be transmitted and the MAC CE is multiplexed with the UL data transmission in a TB, i.e., the generated UL TB contains UL data and MAC CE containing SL CSI report. In this case, the priority of transmitting the MAC CE is same as that of the UL data. In another embodiment, the MAC CE is generated immediately without UL data and in this case, a UL TB is generated for the PHY layer only containing the MAC CE carrying the SL-CSI report. The MAC CE is associated with certain UL priority (PQI value and/or PDB). The MAC CE itself triggers SL resource (re)selection mechanism for Mode-2. This MAC CE may be configured with either Mode-1 or Mode-2 transmission—or both—and the corresponding HARQ feedback option may be enabled or disabled, and accordingly specified or (pre)configured.

For Mode-1, separate SR resource is configured by RAN node 210 for MAC CE carrying SL-CSI to all SL-UEs. This MAC CE used to carry SL-CSI may trigger SR requesting resource from RAN node 210 for Mode-1 SL grant. This MAC CE may be configured with SL-HARQ enabled or not, blind (re)transmission and number of blind (re)transmission. However, the number of blind re-transmissions may be same or different compared with that of SL data transmission.

The LCP procedure for transmitting the MAC CE for SL-CSI reporting is based on the defined priority value (for e.g., PQI value). The generated TB containing the MAC CE may also include a source ID of the received CSI-RS transmission, e.g., for the L2 source ID of the TX UE unicast session that transmitted the CSI-RS or requested SL-CSI report. For Mode-2, candidate resource selection/transmission procedure may take into account the PDB value of this MAC CE (e.g., UE selects the T2 value for candidate resource selection based on the priority value defined for this MAC CE) and indicate the same in the QoS priority field in the SCI Note that a RX UE 205 may start/restart a timer whenever it receives CSI-RS transmission or SL-CSI reporting request and may find the candidate resource for transmission within this time window. When the timer expires and if there is no SL resource selected or available for transmission then the MAC CE is not transmitted. The timer is re-started whenever CSI-RS is received, or SL-CSI measurement is received from lower layers. As long as the CSI report is considered pending for transmission (pending flag is defined), UE generates SL-CSI report based on the latest CSI-RS transmission received from the same source. The pending flag is cleared or canceled when the SL-CSI report is transmitted. Alternatively, the RX-UE 207 may include the time-slot number in a radio frame when the CSI report was generated, and the TX UE may choose to accept or ignore the report from RX-UE Solutions for the TX UE 201 reporting SL-CSI to the RAN node 210 are described in greater detail below. In certain embodiments, the TX UE 201 may multiplex SL-CSI values from multiple SL carriers or BWP, panels from one unicast link or destination ID in a MAC CE. In various embodiments, only SL LCHs that are allowed to transmit SL data with Mode-1 configurations are allowed to multiplex SL-CSI reports in a MAC CE.

Note that the TX UE 201 and RX UE 205 may have a plurality of UE panels 225. A "UE panel" may be a logical entity with physical UE antennas mapped to the logical entity. How to map physical UE antennas to the logical entity may be up to UE implementation. Depending on UE's own implementation, a "UE panel" can have at least one of the following functionalities as an operational role: Unit of antenna group to control its Tx beam independently, Unit of antenna group to control its transmission power independently, Unit of antenna group to control its transmission timing independently. The "UE panel" may be transparent to RAN node 210.

For certain condition(s), RAN node 210 or network can assume the mapping between UE's physical antennas to the logical entity "UE panel" will not be changed. For example, the condition may include until the next update or report from the TX UE 201 or comprise a to duration of time over which the RAN node 210 assumes there will be no change to the mapping. The TX UE 201 may report its UE capability with respect to the "UE panel" to the RAN node 210 or network. The UE capability may include at least the number of "UE panels."

In various embodiments, the TX UE 201 and RX UE 205 may support SL transmission from one beam within a panel; with multiple panels, more than one beam (one beam per panel) may be used for SL transmission. In another implementation, more than one beam per panel may be supported/used for SL transmission.

For certain condition(s), RAN node 210 can assume the mapping between UE's physical antennas to the logical entity "UE panel" will not be changed. For example, the condition may include until the next update or report from UE or comprise a duration of time over which the RAN node 210 assumes there will be no change to the mapping. UE may report its UE capability with respect to the "UE panel" to the RAN node 210 or network. The UE capability may include at least the number of "UE panels." In one implementation, the UE may support UL transmission from one beam within a panel; with multiple panels, more than one beam (one beam per panel) may be used for UL transmission. In another implementation, more than one beam per panel may be supported/used for UL transmission.

According to a first solution, the TX UE 201 uses a new MAC CE format is defined to report SL-CSI to the RAN node 210 (e.g., via UL signaling) which contains additional information other than the SL-CSI values. Such additional information may include, but is not limited to, SL link ID, SL BWP ID, panel ID, CSI measurement configuration to help associate SL-CSI reporting to particular SL link ID or destination ID (TX UE may have one or more unicast link with one or more RX UE(s)). One implementation of the MAC CE formation is explained below with reference to FIGS. 4A-4D. Another implementation of the MAC CE formation is explained below with reference to FIGS. 6A-6D.

In various embodiments, the TX UE 201 implements pre-emptive SR transmission to reduce latency in transmitting SL-CSI report to RAN node 210 by requesting UL resources before the available of CSI report at the TX UE. In some embodiments, SL-CSI report triggering conditions are now event triggered based on the availability of SL-CSI report at the TX UE 201.

In various embodiments, the TX UE 201 reduces the overhead of CSI reporting to the RAN node 210 including identifying and combining CSI reports from multiple unicast links belonging to the same TX-RX UE pairs. The multiplexing of CSI reports from multiple unicast links in the same CSI report to RAN node 210 may be undertaken by the TX UE 201 based on certain factors. These factors may include latency bound of the SL-CSI reports and number of Receiver UEs, etc. as discussed in greater detail below.

Figure 3:
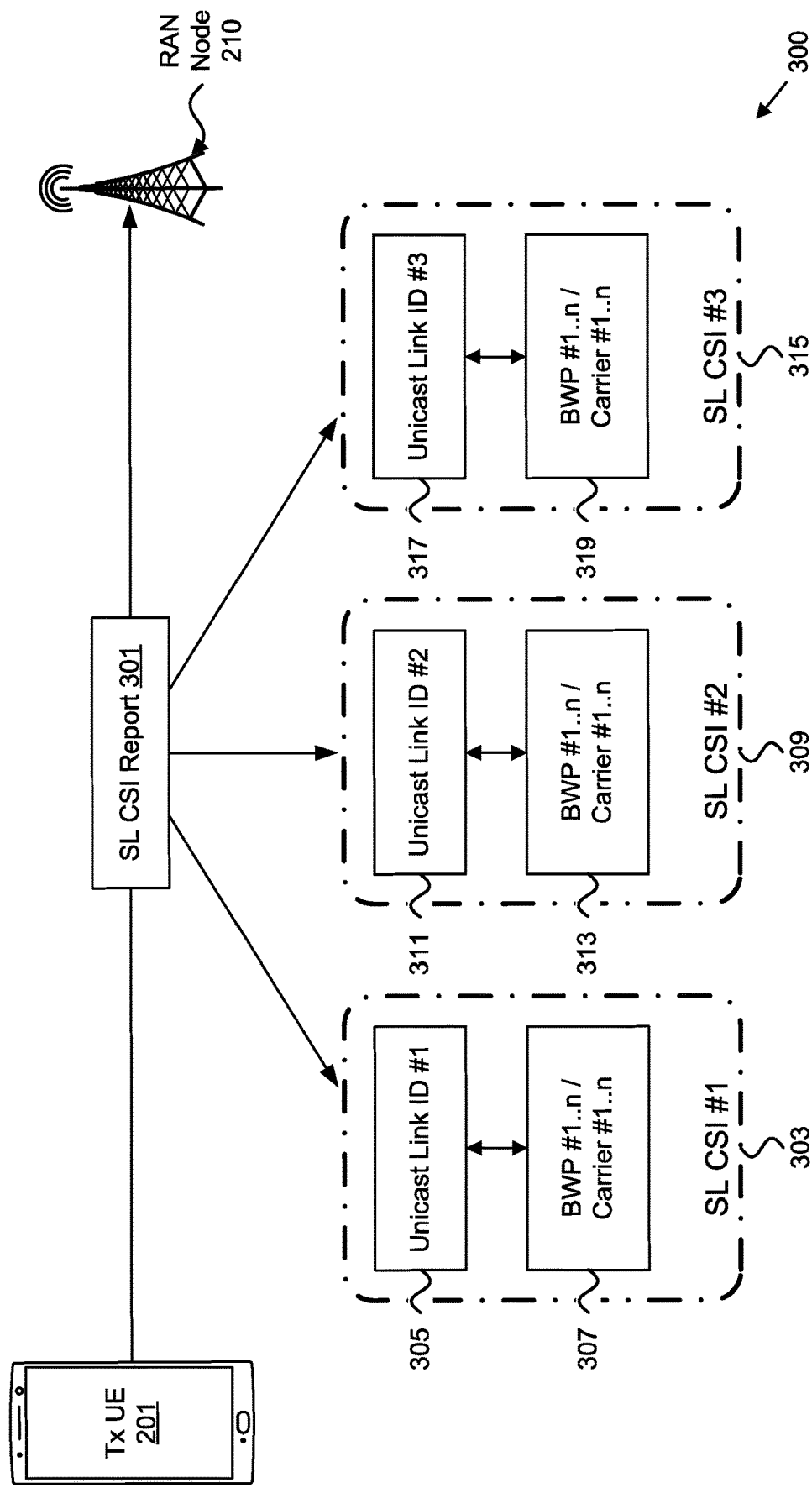
FIG. 3 is a diagram illustrating one embodiment of SL-CSI reporting by a TX UE with multiple unicast RX links.

FIG. 3 depicts a first scenario 300 of a transmitting UE (e.g., the TX UE 201) reporting SL-CSI, e.g., to a RAN node 210. Here, it is assumed that the TX UE 210 has received multiple SL-CSI values from one or more RX UEs (e.g., the RX UE(s) 205). As shown in FIG. 3, the TX UE 201 transmits a SL-CSI report 301 to the RAN node 210. In various embodiments, the SL-CSI report 301 may multiplex SL-CSI values for different SL BWP and/or SL carrier belong to the same or different unicast link ID (or destination ID). In the example depicted, the SL-CSI report 301 includes a first SL-CSI value 303 that is tagged with a first unicast link ID 305 and with at least one BWP ID and/or SL carrier ID 307. The depicted SL-CSI report 301 also includes a second SL-CSI value 309 that is tagged with a second unicast link ID 311 and with at least one BWP ID and/or SL carrier ID 313. The depicted SL-CSI report 301 further includes a third SL-CSI value 315 that is tagged with a third unicast link ID 317 and with at least one BWP ID and/or SL carrier ID 319. Note that the SL-CSI value 303, 309 and 315 may be tagged with multiple BWP/carrier ID(s). Further, each SL-CSI value is tagged with their respective carrier IDs or BWP IDs, which may be the same or different carrier/BWP IDs as tagged in other SL-CSI values.

According to the first solution, the SL-CSI Report 301 is transmitted using a new MAC CE is defined in the Uu interface (Uplink signaling) for carrying SL-CSI value from TX UE 201 to RAN node 210. Said MAC CE has a new field to report SL-CSI values from one or more SL BWP/Carrier received from one or more RX UEs. The MAC CE includes a new field for a unicast link ID (where the link ID uniquely denotes the source-destination pair)—alternatively, for a destination ID—to help associate SL-CSI values reported by the TX UE 201 to a particular unicast link ID (or destination ID) which may belong to same or different RX UE(s) 205.

In certain embodiments, the RAN node 210 may require one or more additional measurement information from TX UE 201 to help associate SL-CSI report to measured SL CSI value. Thus, the TX UE 201 may also tag a SL CSI value with one or more of: sidelink carrier frequency, sidelink BWP, sidelink CSI-RS measurement configuration, SL CSI-RS scheduling information for each SL unicast link(s) measurement, SL latency bound, SL slot number corresponding to the SL-CSI estimated, etc.

In some embodiments, SL LCHs that are allowed to transmit SL data with Mode-1 configurations are allowed to multiplex SL-CSI reports in a MAC CE. In another example, RAN node 210 may configure via RRC signaling whether the Mode-1 SL LCH(s) should send SL-CSI reports to RAN node 210, RAN node 210 may also enable/disable SL-CSI reporting for each unicast link(s) or destination ID(s).

In various embodiments, priority of SL LCH(s) and/or minimum latency bound for the SL-CSI reporting from RX UE(s) may also be used as a selection criterion if there are limited resources. If there are multiple unicast link(s) or destination ID(s) with the same priority, then TX UE 201 may select using rules defined below with reference to the fifth solution.

Figure 4A:
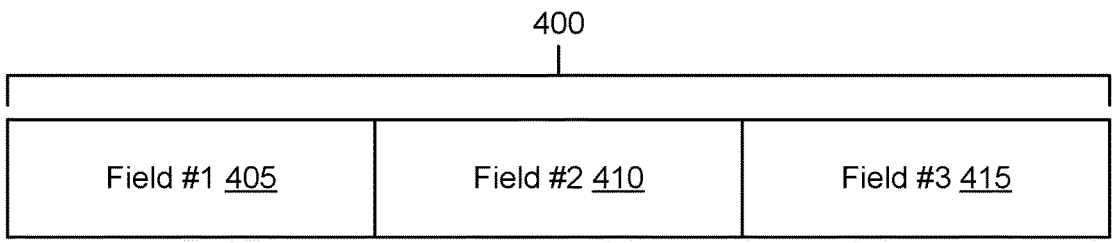
FIG. 4A is a diagram illustrating one embodiment of a MAC CE with multiple unicast RX links.

FIGS. 4A-4D depicts a MAC CE 400, according to embodiments of the first solution. FIG. 4A depicts the MAC CE 400 containing a plurality of SL fields, including a first field 405, a second field 410, and a third field 415. Here, the first field 405 provides information for a first SL Link and the second field 410 provides information for a second SL Link.

Figure 4B:
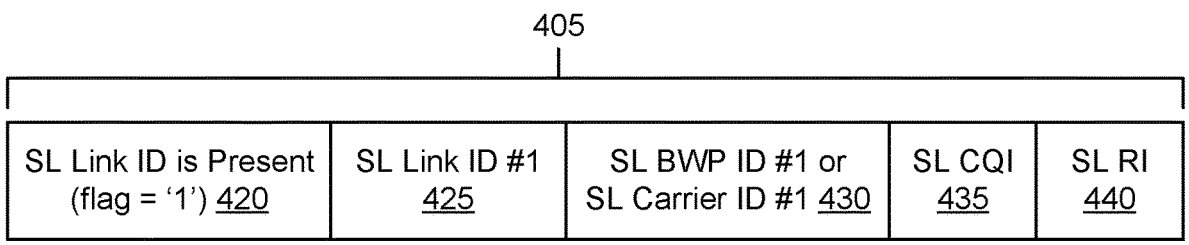
FIG. 4B is a diagram illustrating one embodiment of a first field of the MAC CE of FIG. 4A.

FIG. 4B depicts one embodiment of the first field 405. As depicted, the first field 405 may begin with a SL link ID presence/absence flag 420 (e.g., 1-bit flag) where, for example, the value '1' indicates the presence of SL link ID. The presence bit/flag 420 is followed by first SL link ID (or destination ID) sub-field 425 and then followed by first SL BWP ID or SL carrier ID sub-field 430, and then followed by first SL CQI 435 and first SL RI 440 values. Here, SL CQI/RI measurement and derivation may be based on the existing physical layer procedure for Uu (e.g., 4-bit Channel Quality Indicator and 1-bit or 2-bit Rank Indicator, depending on number of transmission layers and/or antenna ports). Note that it is possible to extend the first field 405 with other SL-CSI values like PMI (precoding matrix indicator), SL beam measurement reports etc.

Figure 4C:
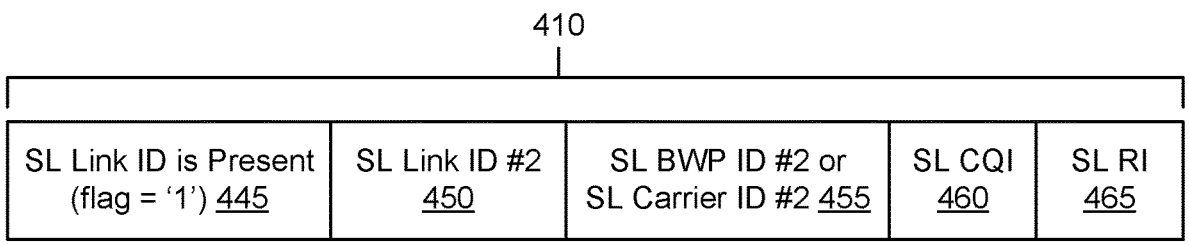
FIG. 4C is a diagram illustrating one embodiment of a second field of the MAC CE of FIG. 4A.

FIG. 4C depicts one embodiment of the second field 410. As depicted, the second field 410 may begin with a SL link ID presence/absence flag 445 (e.g., 1-bit flag) and is followed by second SL link ID (or destination ID) sub-field 450 and then followed by second SL BWP ID or SL carrier ID sub-field 455, and then followed by second SL CQI 460 and second SL RI 465 values. Again, SL CQI/RI measurement and derivation may be based on the existing physical layer procedure for Uu. Additionally, the second field 410 may be extended with other SL-CSI values like PMI, SL beam measurement reports etc.

Figure 4D:
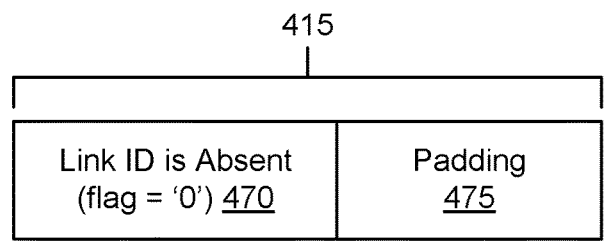
FIG. 4D is a diagram illustrating one embodiment of a third field of the MAC CE of FIG. 4A.

FIG. 4D depicts one embodiment of the third field 415. In the third field 415, the value of '0' in the SL link ID absence flag 470 indicates the absence of SL link information which is followed by padding 475. In the above implementation, the MAC CE 400 may also be formed with one or more field(s) absent. In another example, a flag may be added in front of every sub-field to indicate its presence or absence. Where the flag indicates absence of a field or sub-field, padding bits may be added to ensure consistent bit-length of the field or sub-field.

In various embodiments, in order to avoid end-to-end delay, the TX UE 201 may implement a pre-emptive Scheduling Request ("SR") mechanism. In one embodiment, the pre-emptive SR mechanism includes transmitting SR as soon as the TX UE 201 receives DCI with SL-CSI request from. In another embodiment, the pre-emptive SR mechanism includes transmitting SR as soon as the TX UE 201 transmit SL-CSI request in SCI, it transmits a SR message to RAN node 210 to request for UL resource before the available of CSI report at the TX UE.

A separate SR resource may be configured for this purpose. RAN node 210 may provide UL grant for PUSCH for SL-CSI report transmission within the configured latency bound. RAN node 210 may enable/disable pre-emptive SR transmission for TX UE based on the SL-LCH priority from QoS of data and it may be independently configured per SL-LCH. In another method, the pre-emptive SR may also be enabled based on the configuration of end to end latency bound of SL-CSI reporting to RAN node 210.

In various embodiments, the TX UE 201 may reduce the overhead of CSI reporting to the RAN node 210 including identifying and combining/merging CSI reports from multiple unicast links belonging to the same TX-RX UE pairs. In one example, along with the merged CSI values the TX UE may transmit individual unicast link ID that contains the same CSI values in the MAC CE 400.

In various embodiments, the conditions triggering the SL-CSI report 301 may be event triggered, e.g., based on the availability of SL-CSI report at the TX UE 201. As long as the SL-CSI reporting event is considered pending for transmission (e.g., a pending flag is defined) for a certain unicast link or destination ID, the TX UE 201 may generate a MAC CE 400 based on the latest SL CSI-RS report received from the RX UE(s) 205 for the same unicast link ID or destination ID. Here, the pending flag may be cleared (or canceled) for that unicast link or destination ID after the MAC CE 400 of the corresponding SL-CSI report 301 is transmitted to RAN node 210.

In various embodiments, the multiplexing of SL-CSI value from multiple unicast links in the same SL-CSI report 301 to the RAN node 210 may be undertaken by the TX UE 201 based on certain factors. These factors may include: latency bound of the SL-CSI reports, number of RX UEs 205, etc. The latency bound for reporting the SL-CSI value to the RAN node 210 may be configured via RRC signaling and the value of the latency bound configuration may be different considering different service type associated with different unicast link ID or destination ID.

In one embodiment, the latency bound signaled (e.g., via RRC) from RAN node 210 may be an end-to-end latency bound that includes both RX UE(s)-to-TX UE reporting and TX UE-to-RAN node reporting. In another embodiment, the signaled latency bound is separately provided for RX UE(s)-to-TX UE reporting and for TX UE-to-RAN node reporting.

In certain embodiments, if RAN node 210 receives SL-CSI report with a SL_CSI value that is outside the latency bound, then RAN node 210 may choose to ignore or drop the SL-CSI value (or the entire report). In certain embodiments, if the TX UE 210 determines that a SL-CSI value does not meet the configured latency bound for transmitting to RAN node 210, then it does not transmit the SL-CSI value and may inform RAN node 210 in the UL signaling about the cause for the same. In one example, the cause value may be SL link failure or SL-CSI late arrival from RX UE 205 to TX UE 201, etc. Note that in the case of multiplexing multiple SL-CSI values into the SL-CSI report 301, the expired SL-CSI values may be dropped (i.e., not multiplexed into the report 301).

In various embodiments, RAN node 210 may indicate in the DCI to request SL-CSI report(s) from TX UE 201. In one embodiment, the SL-CSI request in the DCI may also include unicast link ID(s) or destination ID(s) and—in that case—the TX UE 201 is only allowed to transmit/multiplex SL-CSI values for the specified unicast link ID(s) or destination ID(s). In such embodiments, the TX UE 201 may form a MAC CE containing SL-CSI values only for that unicast link ID(s) or destination ID(s).

In another embodiment, the SL-CSI request in the DCI does not include any unicast link or destination ID. In this case, the TX UE 201 is not restricted by unicast link(s)/destination ID(s) and is thus allowed to transmit/multiplex SL-CSI values in a MAC CE for SL LCHs that belong to any of the one or more unicast links or destination IDs that are allowed to transmit SL data with Mode-1 configurations and where the SL-CSI report is available.

For the above methods, when TX UE 201 receives SL CSI-RS request from RAN node 210, it may start transmitting SL CSI-RS corresponding to one or more unicast links or destination IDs for SL LCHs with Mode-1 configurations and request SL-CSI values accordingly.

In some embodiments, the MAC CE 400 is generated for UL by the TX UE 201 only when there is SL-CSI report received from RX UE(s) 205 and when the SL-CSI report is pending MAC CE 400 may be multiplexed with UL data i.e., generated UL TB contains UL data and MAC CE containing SL CSI report and in that case, the priority of transmitting the MAC CE 400 is same as that of the UL data.

In some embodiments, the MAC CE 400 may be generated immediately even without UL data i.e., generated UL TB contains only MAC CE containing SL CSI report. This MAC CE 400 is associated with certain UL priority and the MAC CE 400 itself may trigger a SR transmission to request PUSCH resource for UL transmission. In certain embodiments, a separate SR resource may be configured by RAN node 210 for a MAC CE carrying SL-CSI, e.g., to all UEs. The LCP procedure for transmitting the MAC CE 400 for SL-CSI reporting may be based on the defined SL priority value, where the priority of this MAC CE 400 may be same or lower or higher compared with the priority of the MAC CE of the SL BSR.

According to a second solution, when transmitting the SL-CSI report 301 using UL PUCCH/PUSCH, each SL-CSI value (e.g., 303, 309, 315) is tagged or associated with corresponding SL link ID or destination ID, as described above. In various embodiments, the SL-CSI value(s) may be tagged with additional information such as SL BWP ID or carrier ID, Sidelink CSI-RS measurement configuration, SL CSI-RS scheduling information for each unicast link(s), latency bound, SL slot number etc., as explained in the first solution. Here, SL-CSI report triggering conditions may be event triggered based on the availability of SL-CSI report at the TX UE 201, as explained in the first solution.

In some implementations of the second solution, a separate SR resource may be configured to request either a PUCCH or a PUSCH resource from the RAN node 210. In one embodiment, the trigger for SR transmission may be due to pending SL-CSI in MAC. In another embodiment, the trigger for SR transmission may be due to receiving a SL-CSI request in DCI from the RAN node 210. In other embodiments, the trigger for SR transmission may be due to SL-CSI request transmitted by the TX UE 201 in SCI to the RX UE(s) 205. In case of pre-emptive SR configured for this SL LCH, the SR message may be transmitted to request for PUCCH or PUSCH resource as soon as the DCI containing a request for SL-CSI reporting is received by the TX UE 201 or as soon as the SCI containing a request for SL-CSI reporting is transmitted by the TX UE 201, as explained in the first solution.

In some embodiments, the NR DCI may contain a field for UL PUCCH resource and timing related information to report SL-CSI values. In certain embodiments, the timing information may be 'k', defined in number of slots from the NR DCI reception to UL PUCCH transmission. In other embodiments, the timing information may be 'k', defined as the number of slots from the SCI transmission to UL PUCCH transmission.

Figure 5:
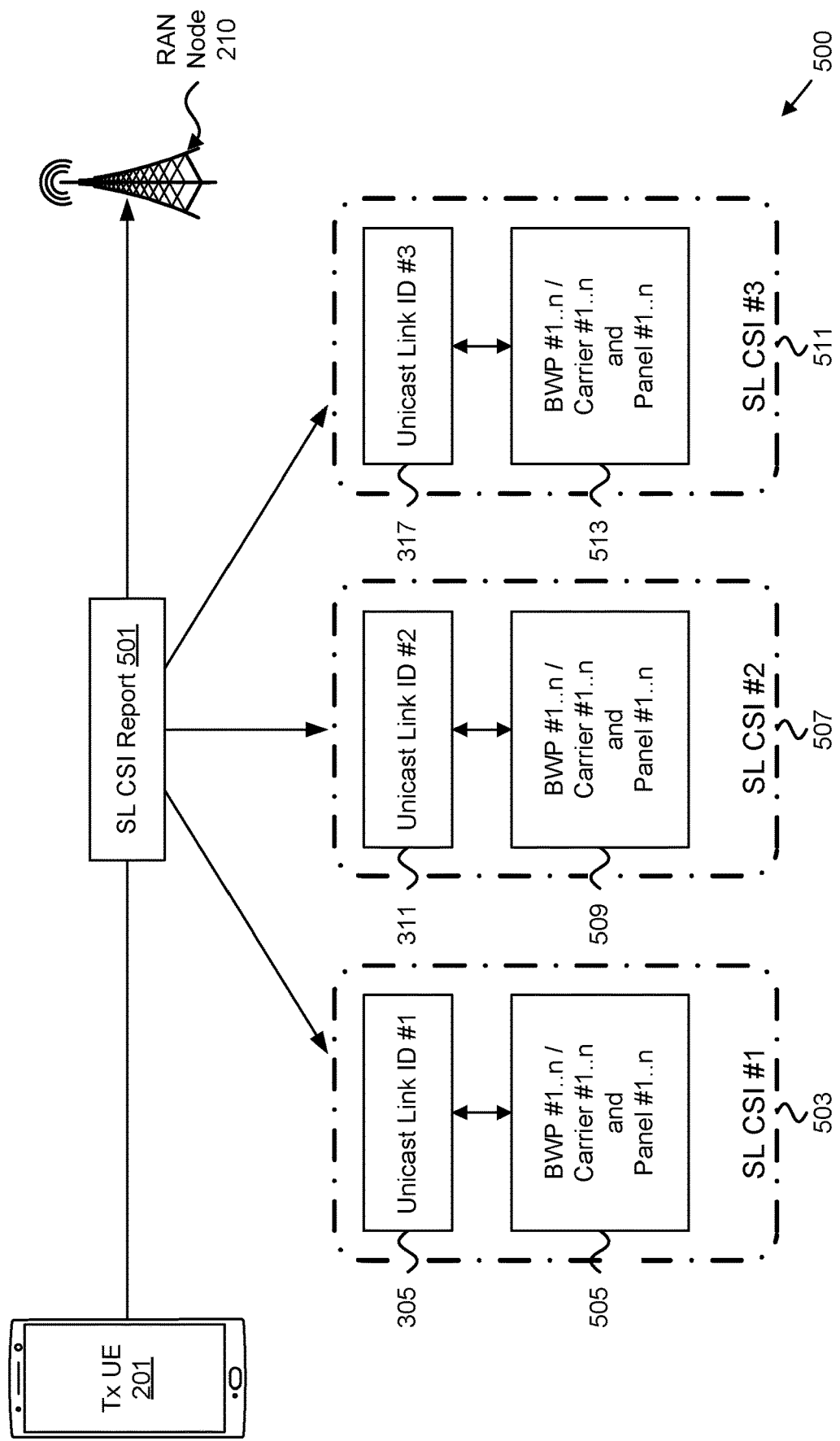
FIG. 5 is a diagram illustrating one embodiment of SL-CSI reporting with panel ID(s) in MAC CE.

FIG. 5 depicts a second scenario 500 of a transmitting UE (e.g., the TX UE 201) reporting SL-CSI, e.g., to a RAN node 210, according to a third solution. In the second scenario 500, the TX UE 201 includes multiple logical panels and the SL-CSI includes SL logical panel IDs in a SL-CSI report 501. The second scenario 500 is similar to the first scenario 300, discussed above, but applies to the case of multi-panel SL transmission. Here, it is assumed that the TX UE 210 has received multiple SL-CSI values from one or more RX UEs (e.g., the RX UE(s) 205). In the second scenario 500, SL-CSI reporting from the RX UE 205 may also include corresponding panel ID(s) in the SL-CSI report 501 for which the measurement was undertaken.

According to the third solution, the SL-CSI report 501 sent to the RAN node 210 includes additional information along with the SL-CSI values such as panel ID(s) (both TX UE panel ID(s) and RX UE panel ID(s) used for SL transmission) used for SL-CSI measurement in both the TX UE 201 and the RX UE 205.

As shown in FIG. 5, the TX UE 201 transmits the SL-CSI report 501 to the RAN node 210. The SL-CSI report 501 may be transmitted in a MAC CE. Alternatively, the SL-CSI report 501 may be transmitted via PUCCH or PUSCH transmission, as explained in the second solution.

In various embodiments, the SL-CSI report 501 may multiplex SL-CSI values for different SL BWP and/or SL carrier and logical panel/beam combinations that belong to the same or different unicast link ID (or destination ID). In the example depicted, the SL-CSI report 501 includes a first SL-CSI value 503 that is tagged with a first unicast link ID 305 and with a BWP ID and/or SL carrier ID and Panel ID 505. The depicted SL-CSI report 501 also includes a second SL-CSI value 507 that is tagged with a second unicast link ID 311 and with a BWP ID and/or SL carrier ID and Panel ID 509. The depicted SL-CSI report 501 further includes a third SL-CSI value 511 that is tagged with a third unicast link ID 317 and with a BWP ID and/or SL carrier ID and Panel ID 513. Note that the SL-CSI value 503, 507 and 511 may be tagged with multiple BWP/carrier ID(s). Further, each SL-CSI value is tagged with their respective carrier IDs or BWP IDs, which may be the same or different carrier/BWP IDs as tagged in other SL-CSI values.

Figure 6A:
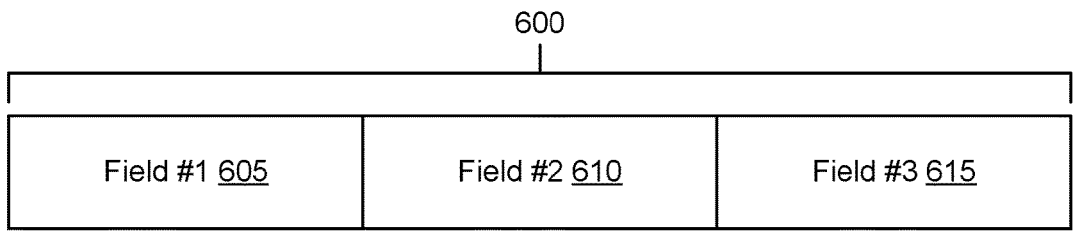
FIG. 6A is a diagram illustrating one embodiment of a MAC CE with multiple unicast RX links and panel ID(s)

FIGS. 6A-6D depict a MAC CE 600, according to embodiments of the third solution. FIG. 6A depicts the MAC CE 600 containing a plurality of SL fields, including a first field 605, a second field 610, and a third field 615. Here, the first field 605 provides information for a first SL Link and panel/beam combination and the second field 410 provides information for a second SL Link and panel/beam combination.

Figure 6B:
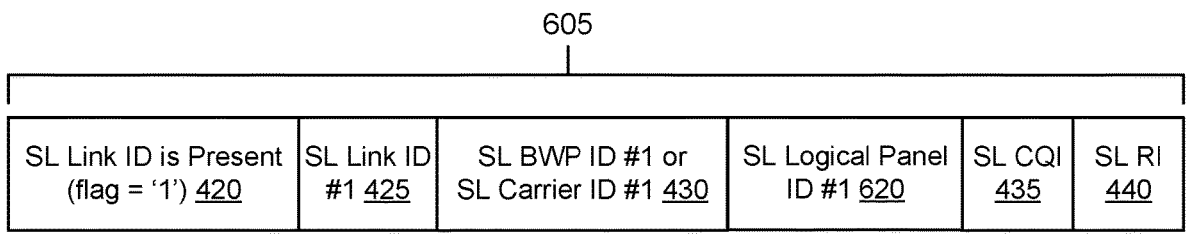
FIG. 6B is a diagram illustrating one embodiment of a first field of the MAC CE of FIG. 6A.

FIG. 6B depicts one embodiment of the first field 605. As depicted, the first field 605 may begin with a SL link ID presence/absence flag 620 (e.g., 1-bit flag) where, for example, the value '1' indicates the presence of SL link ID. The presence bit/flag 620 is followed by first SL link ID (or destination ID) sub-field 625 and then followed by first SL BWP ID or SL carrier ID and SL panel ID sub-field 630, and then followed by first SL CQI 635 and first SL RI 640 values. Additionally, the first field 610 may contain PMI, SL beam measurement reports etc. Here, SL CQI/RI measurement and derivation may be as described above with reference to FIGS. 4A-4D.

Figure 6C:
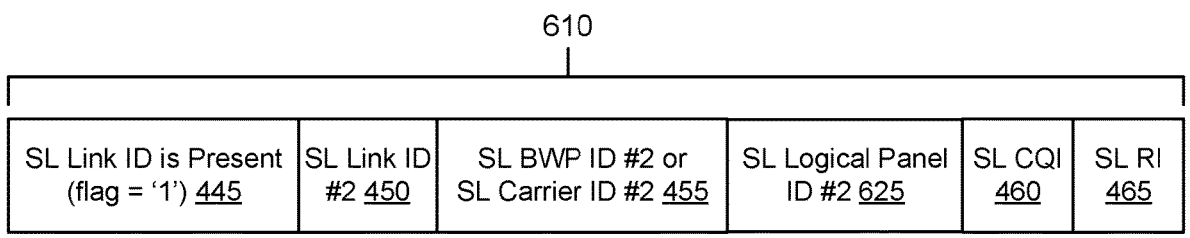
FIG. 6C is a diagram illustrating one embodiment of a second field of the MAC CE of FIG. 6A.

FIG. 6C depicts one embodiment of the second field 610. As depicted, the second field 610 may begin with a SL link ID presence/absence flag 645 (e.g., 1-bit flag) and is followed by second SL link ID (or destination ID) sub-field 650 and then followed by second SL BWP ID or SL carrier ID and panel ID sub-field 655, and then followed by second SL CQI 660 and second SL RI 665 values. Again, SL CQI/RI measurement and derivation may be based on the existing physical layer procedure for Uu. Additionally, the second field 610 may be extended with other SL-CSI values like PMI, SL beam measurement reports etc.

In a key difference from the MAC CE 400, the MAC CE 600 includes new fields for panel ID(s) to help associate SL-CSI values reported by a RX UE(s) (for e.g., unicast link ID or destination ID belonging to the same or different RX UE(s)) to the SL-CSI measurements performed with a panel(s). As depicted, the first SL BWP ID or SL carrier ID sub-field 630 is expanded to provide first panel ID(s) (alternatively, beam IDs) associated with the first SL Link. Similarly, the second SL BWP ID or SL carrier ID sub-field 655 is expanded to provide second panel ID(s) (alternatively, beam IDs) associated with the second SL Link.

Figure 6D:
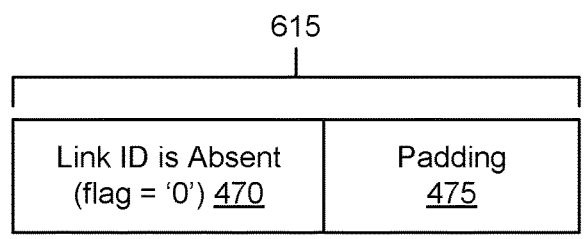
FIG. 6D is a diagram illustrating one embodiment of a third field of the MAC CE of FIG. 6A.

FIG. 6D depicts one embodiment of the third field 615. In the third field 615, the value of '0' in the SL link ID absence flag 670 indicates the absence of SL link information which is followed by padding 675. In the above implementation, the MAC CE 600 may also be formed with one or more field(s) absent. In another example, a flag may be added in front of every sub-field to indicate its presence or absence. Where the flag indicates absence of a field or sub-field, padding bits may be added to ensure consistent bit-length of the field or sub-field.

According to a fourth solution, the SL-CSI may be reported via assistance information, e.g., with RRC signaling. Considering one or more combination of the above solutions, SL-CSI reporting may also be transmitted with UE assistance information like RRC signaling where the report of SL-CSI is transmitted to gNB along with the unicast link ID or destination ID and also panel ID(s). Triggers for requesting resource for assistance information (i.e., PUSCH resource) may be based one or more combination of the above solutions.

The TX UE 201 needs to select a single destination for data transmission among multiple destinations having data available for transmission when a grant (Mode-1 or Mode-2) appears. In certain embodiments, there may be a highest priority destination (i.e., destination ID of the highest priority logical channel among all LCHs across destinations having data available for transmission). However, if there are more than one such "highest priority destination," current techniques offer no guidance on how the TX UE 201 is to select one destination out of these destinations for data transmission.

According to a fifth solution, one destination is to be randomly selected out of these multiple competing destinations. In a variant of the fifth solution, the TX UE 201 determines the "highest priority destination" as the destination corresponding to the next highest priority LCH having data available for transmission, of any of the competing destinations. So, if there are more than one destinations with one or more LCH(s) having the same priority for the highest priority logical channel with data, then the comparison is to be made based on the next highest priority LCH in the competing destinations.

In another variant of the fifth solution, when there are more than one such "highest priority destination," another QoS attribute may be used to compare the competing logical channels in the said multiple destinations. The specific QoS attribute may be latency or reliability as examples. In this sense, a destination with the highest priority LCH is to be selected if the LCH has a lower latency (and/or higher reliability and/or smaller remaining PDB) compared with other competing LCH(s) of other destination(s).

According to a sixth solution, the TX UE 201 may configure code block group ("CBG")-based HARQ feedback for a RX UE with a unicast link, e.g., using a PC5 RRC signaling, or using SCI, or using MAC CE, or being preconfigured for out of coverage UEs. The TX UE may also provide resources for Physical sidelink feedback channel ("PSFCH") to report CBG-based ACK/NACK using a set of code division multiplexing ("CDM") resources where mapping between the CBG and cyclic shifts for the CDM resources is signaled via PC5 RRC or SCI or MAC CE. In one implementation, the mapping between CBG and CDM may be have a one-to-one relationship, for example, Cyclic shifts #1 may be related to CBG #1, Cyclic shifts #2 may be related to CBG #2, and so on.

For a TX UE 201, only SL LCHs that are allowed to transmit SL data with Mode-1 configurations are allowed to multiplex CBG-based HARQ feedback report to the RAN node 210. Here, the DCI may contain a field for PUCCH timing and resources for reporting SL CBG to the RAN node 210. The cyclic shifts for the PUCCH resource to report SL CBG and its mapping rule may be semi-statically configured e.g., via RRC signaling.

Figure 7A:
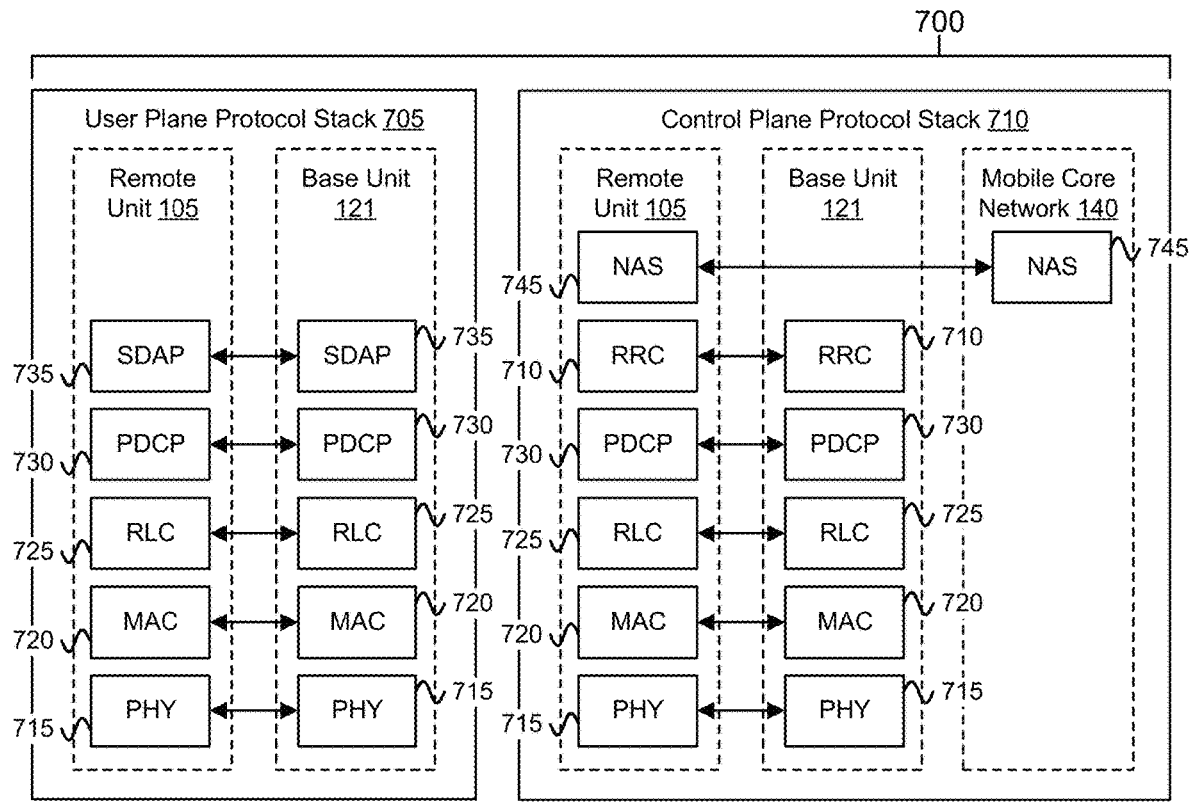
FIG. 7A is a diagram illustrating one embodiment of a NR protocol stack.

FIG. 7A depicts a NR protocol stack 700, according to embodiments of the disclosure. While FIG. 7A shows the remote unit 105, the base unit 121 and the mobile core network 140, these are representative of a set of UEs interacting with a RAN node and a NF (e.g., AMF) in a core network. As depicted, the protocol stack 700 comprises a User Plane protocol stack 705 and a Control Plane protocol stack 710. The User Plane protocol stack 705 includes a physical ("PHY") layer 715, a Medium Access Control ("MAC") sublayer 720, a Radio Link Control ("RLC") sublayer 725, a Packet Data Convergence Protocol ("PDCP") sublayer 730, and Service Data Adaptation Protocol ("SDAP") layer 735. The Control Plane protocol stack 710 also includes a physical layer 715, a MAC sublayer 720, a RLC sublayer 725, and a PDCP sublayer 730. The Control Place protocol stack 710 also includes a Radio Resource Control ("RRC") layer and a Non-Access Stratum ("NAS") layer 745.

The AS protocol stack for the Control Plane protocol stack 710 consists of at least RRC, PDCP, RLC and MAC sublayers, and the physical layer. The AS protocol stack for the User Plane protocol stack 705 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 740 and the NAS layer 745 for the control plane and is includes, e.g., an Internet Protocol ("IP") layer or PDU Layer (note depicted) for the user plane. L1 and L2 are referred to as "lower layers" such as PUCCH/PUSCH or MAC CE, while L3 and above (e.g., transport layer, application layer) are referred to as "higher layers" or "upper layers" such as RRC.

The physical layer 715 offers transport channels to the MAC sublayer 720. The MAC sublayer 720 offers logical channels to the RLC sublayer 725. The RLC sublayer 725 offers RLC channels to the PDCP sublayer 730. The PDCP sublayer 730 offers radio bearers to the SDAP sublayer 735 and/or RRC layer 740. The SDAP sublayer 735 offers QoS flows to the mobile core network 140 (e.g., 5GC). The RRC layer 740 provides for the addition, modification, and release of Carrier Aggregation and/or Dual Connectivity. The RRC layer 740 also manages the establishment, configuration, maintenance, and release of Signaling Radio Bearers ("SRBs") and Data Radio Bearers ("DRBs"). In certain embodiments, a RRC entity functions for detection of and recovery from radio link failure.

Figure 7B:
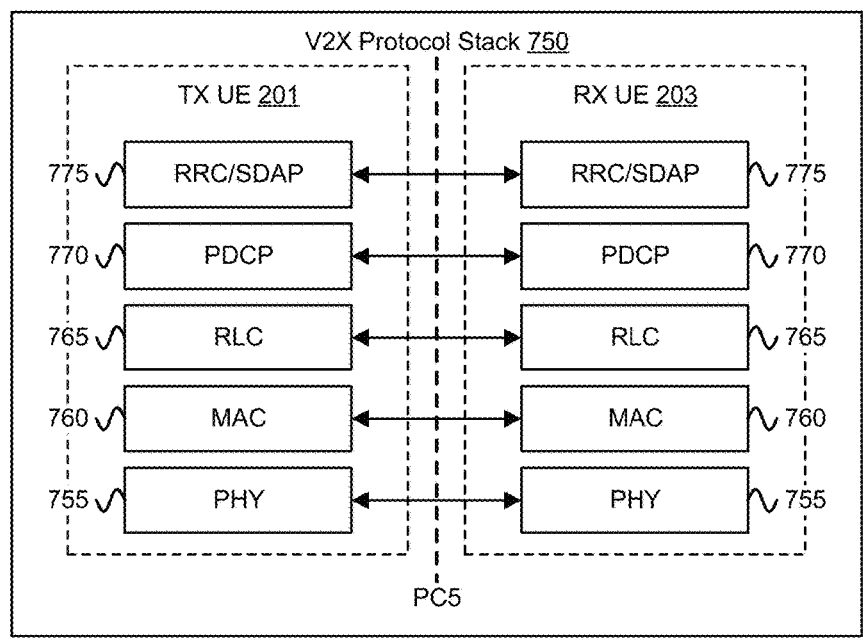
FIG. 7B is a diagram illustrating one embodiment of a PC5 protocol stack.

FIG. 7B depicts a PC5 protocol stack 750, according to embodiments of the disclosure. While FIG. 7B shows the TX UE 201 and the RX UE 203, these are representative of a set of UEs communicating peer-to-peer via PC5 and other embodiments may involve different UEs. As depicted, the PC5 protocol stack includes a physical layer 755, a MAC sublayer 760, a RLC sublayer 765, a PDCP sublayer 770, and RRC and SDAP layers (depicted as combined element "RRC/SDAP" 775), for the control plane and user plane, respectively.

The AS protocol stack for the control plane in the PC5 interface consists of at least RRC, PDCP, RLC and MAC sublayers, and the physical layer. The AS protocol stack for the user plane in the PC5 interface consists of at least SDAP, PDCP, RLC and MAC sublayers, and the physical layer. The L2 is split into the SDAP, PDCP, RLC and MAC sublayers. The L3 includes the RRC sublayer and the NAS layer for the control plane and includes, e.g., an IP layer for the user plane. L1 and L2 are referred to as "lower layers", while L3 and above (e.g., transport layer, V2X layer, application layer) are referred to as "higher layers" or "upper layers."

Figure 8:
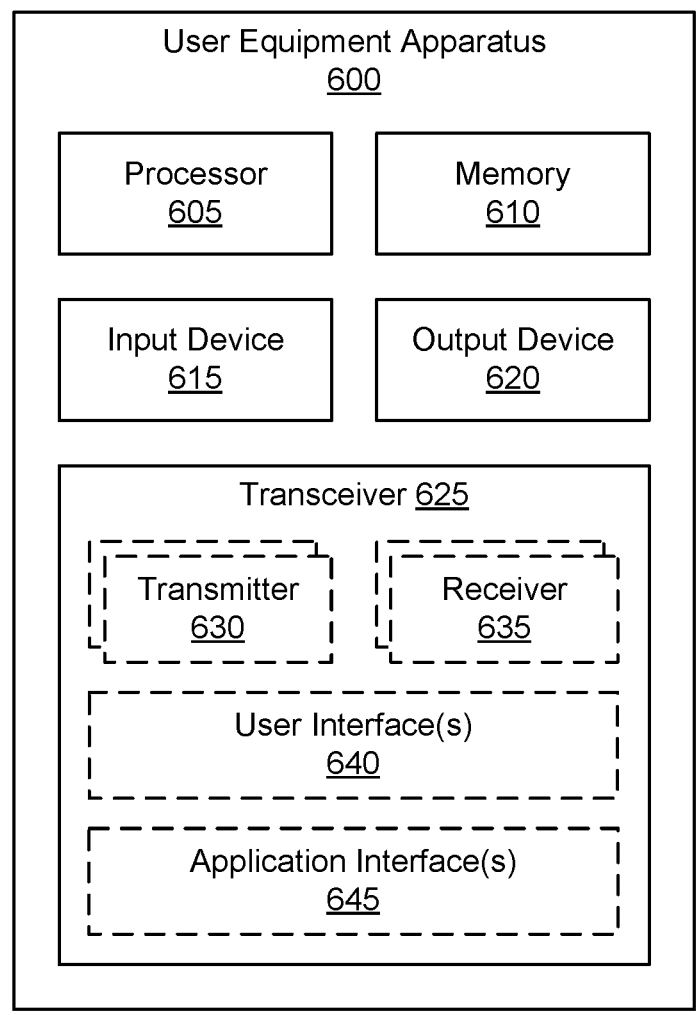
FIG. 8 is a diagram illustrating one embodiment of a user equipment apparatus that may be used for transmitting SL CSI using an uplink channel.

FIG. 8 depicts a user equipment apparatus 800 that may be used for transmitting SL CSI using an uplink channel, according to embodiments of the disclosure. In various embodiments, the user equipment apparatus 800 is used to implement one or more of the solutions described above. The user equipment apparatus 800 may be one embodiment of the remote unit 105 and/or any of the V2X UEs 201, 203, 405, 410, 415, and 420, described above. Furthermore, the user equipment apparatus 800 may include a processor 805, a memory 810, an input device 815, an output device 820, and a transceiver 825.

In some embodiments, the input device 815 and the output device 820 are combined into a single device, such as a touchscreen. In certain embodiments, the user equipment apparatus 800 may not include any input device 815 and/or output device 820. In various embodiments, the user equipment apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more cells supported by one or more base units 121. Additionally, the transceiver 825 may support at least one network interface 840 and/or application interface 845. The application interface(s) 845 may support one or more APIs. The network interface(s) 840 may support 3GPP reference points, such as Uu and PC5. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the processor 805 controls the user equipment apparatus 800 to implement the above described UE behaviors. For example, the processor 805 receives (i.e., via the transceiver 825) a first SL-CSI value from a RX UE via one of a plurality of unicast links. The processor 805 generates a SL-CSI report comprising the first SL-CSI value, wherein the first SL-CSI value is tagged with an identifier that identifies the RX UE.

In some embodiments, the processor 805 controls the transceiver 825 to transmit a MAC CE to a RAN node using an uplink channel, the MAC CE containing the SL-CSI report. In some embodiments, the MAC CE further includes an additional field to report one or more of: a SL-CSI measurement configuration, a SL BWP ID, a SL carrier ID, a SL logical panel ID, and a SL Slot number.

In some embodiments, generating the SL-CSI report occurs in response to the user equipment apparatus 800 having SL-CSI report pending flag. In such embodiments, the processor 805 clears the flag after the transmission of the MAC CE. In some embodiments, the user equipment apparatus 800 operates in a first sidelink mode (i.e., SL Mode-1) corresponding to a network-scheduled sidelink operation. In such embodiments, generating the SL-CSI report includes forming the MAC CE only from one or more SL logical channels configured to transmit SL data using Mode-1.

In some embodiments, the processor 805 triggers a SR transmission to request a PUSCH resource for the transmission of the MAC CE. In some embodiments, the processor 805 controls the transceiver 825 to transmit a SR to request an uplink resource (i.e., PUSCH) prior to receiving the first SL-CSI value from the RX UE, according to the preemptive SR mechanisms described above. In one embodiment of preemptive SR, the transceiver 825 transmits the SR in response to receiving a SL-CSI request from the RAN node in DCI, where the SR is transmitted prior to receiving the first SL-CSI value from the RX UE. In another embodiment of preemptive SR, the transceiver 825 transmits the SR in response to transmitting SCI to the RX UE, said SCI containing a SL-CSI request, where the SR is transmitted prior to receiving the first SL-CSI value from the RX UE.

In some embodiments, generating the SL-CSI report comprises multiplexing a plurality of SL-CSI values from the plurality of unicast links, each SL-CSI value being tagged with a different identifier. Here, the identifiers with which the different SL-CSI value is tagged may be a Destination ID, a Unicast Link ID, a SL BWP ID, a SL carrier ID, a SL logical panel ID, or combinations thereof as described above. In one embodiment, the identifier is a combination of the above IDs that uniquely identifies the RX UE reporting CSI.

In some embodiments, multiplexing the plurality of SL-CSI values from the plurality of unicast links is based on a latency bound of the SL-CSI values. In one embodiment, the latency bound is signaled via RRC from the RAN node, the latency bound configured as an end-to-end latency bound applicable to both a RX UE-to-TX UE reporting period and a TX UE-to-RAN node reporting period. In another embodiment, the latency bound is signaled via RRC from the RAN node, the latency bound including a first latency bound applicable to a RX UE-to-TX UE reporting period and a second latency bound applicable to a TX UE-to-RAN node reporting period. In the above embodiments, a second SL-CSI value that exceeds the latency bound is excluded from the SL-CSI report.

In other embodiments, the processor 805 controls the transceiver 825 to transmit the SL-CSI report to a RAN node using a L1 UL control channel. In some embodiments, the L1 UL control channel is a PUCCH. In such embodiments, the transceiver 825 receives DCI, the DCI carrying time and frequency information for the PUCCH carrying the SL-CSI report, where transmitting the SL-CSI report comprises a PUCCH transmission. In certain embodiments, the timing information in DCI comprises a parameter 'k' that defines a number of slots between the DCI reception and the PUCCH transmission.

In some embodiments, the processor 805 controls the transceiver 825 to transmit SCI to the RX UE, said SCI containing a SL-CSI request, where the RX UE transmits the first SL-CSI value in response to the SL-CSI request. In such embodiments, the timing information in DCI comprises a parameter 'k' that defines a number of slots between the SCI transmission and the PUCCH transmission.

In some embodiments, the L1 UL control channel transmission comprises an additional field to report one or more of: a SL-CSI measurement configuration, a SL BWP ID, a SL carrier ID, a SL logical panel ID, and a SL Slot number.

In various embodiments, the identifier with which a SL-CSI value is tagged comprises a link ID that uniquely denotes a source-destination pair between the user equipment apparatus 800 and the RX UE. In some embodiments, the identifier with which a SL-CSI value is tagged comprises a destination ID corresponding to the RX UE. In one embodiment, generating the SL-CSI report comprises multiplexing a plurality of SL-CSI values from multiple carriers and/or bandwidth parts for the same source-destination pair. In another embodiment, generating the SL-CSI report comprises multiplexing a plurality of SL-CSI values from multiple panels and/or beams for the same source-destination pair.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to transmitting SL CSI using an uplink channel. For example, the memory 810 may store resource allocations, SL-CSI values, LCH data, MAC PDUs, TBs, and the like. In certain embodiments, the memory 810 also stores program code and related data, such as an operating system or other controller algorithms operating on the apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the user equipment apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to provide UL communication signals to a base unit 121, such as the UL transmissions described herein. Similarly, one or more receivers 835 may be used to receive DL communication signals from the base unit 121, as described herein. Although only one transmitter 830 and one receiver 835 are illustrated, the user equipment apparatus 800 may have any suitable number of transmitters 830 and receivers 835. Further, the transmitter(s) 830 and the receiver(s) 835 may be any suitable type of transmitters and receivers. In one embodiment, the transceiver 825 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 825, transmitters 830, and receivers 835 may be implemented as physically separate components that access a shared hardware resource and/or software resource, such as for example, the network interface 840.

In various embodiments, one or more transmitters 830 and/or one or more receivers 835 may be implemented and/or integrated into a single hardware component, such as a multi-transceiver chip, a system-on-a-chip, an ASIC, or other type of hardware component. In certain embodiments, one or more transmitters 830 and/or one or more receivers 835 may be implemented and/or integrated into a multi-chip module. In some embodiments, other components such as the network interface 840 or other hardware components/ circuits may be integrated with any number of transmitters 830 and/or receivers 835 into a single chip. In such embodiment, the transmitters 830 and receivers 835 may be logically configured as a transceiver 825 that uses one more common control signals or as modular transmitters 830 and receivers 835 implemented in the same hardware chip or in a multi-chip module.

Figure 9:
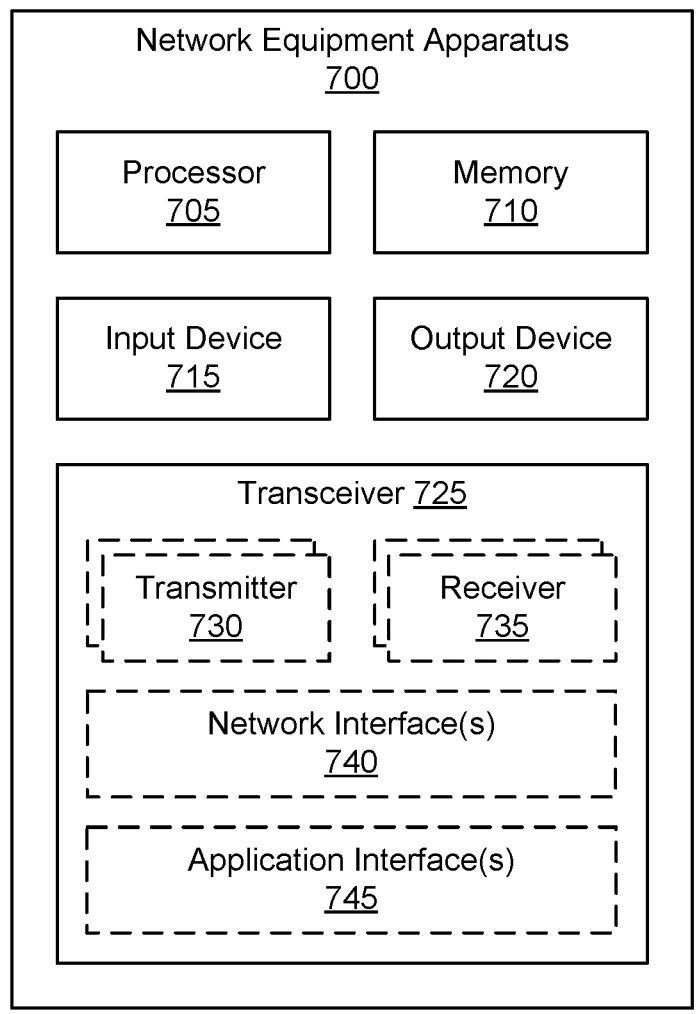
FIG. 9 is a diagram illustrating one embodiment of a network equipment apparatus that may be used for transmitting SL CSI using an uplink channel.

FIG. 9 depicts one embodiment of a network equipment apparatus 900 that may be used for transmitting SL CSI using an uplink channel, according to embodiments of the disclosure. In some embodiments, the network apparatus 900 may be one embodiment of a RAN node and its supporting hardware, such as the base unit 121, RAN node and/or gNB, described above. Furthermore, network equipment apparatus 900 may include a processor 905, a memory 910, an input device 915, an output device 920, and a transceiver 925. In certain embodiments, the network equipment apparatus 900 does not include any input device 915 and/or output device 920.

As depicted, the transceiver 925 includes at least one transmitter 930 and at least one receiver 935. Here, the transceiver 925 communicates with one or more remote units 105. Additionally, the transceiver 925 may support at least one network interface 940 and/or application interface 945. The application interface(s) 945 may support one or more APIs. The network interface(s) 940 may support 3GPP reference points, such as Uu, N1, N2 and N3. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a CPU, a GPU, an auxiliary processing unit, a FPGA, or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925.

In various embodiments, the processor 905 controls the network equipment apparatus 900 to implement the above described RAN node behaviors. For example, the processor 905 may allocate SL resources to a UE, as described herein.

The memory 910, in one embodiment, is a computer readable storage medium. In some embodiments, the memory 910 includes volatile computer storage media. For example, the memory 910 may include a RAM, including DRAM, SDRAM, and/or SRAM. In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data relating to transmitting SL CSI using an uplink channel, for example storing UE identities, SL resource allocations, and the like. In certain embodiments, the memory 910 also stores program code and related data, such as an OS or other controller algorithms operating on the network equipment apparatus 900 and one or more software applications.

The input device 915, in one embodiment, may be substantially as described above with reference to the input device 615. Similarly, the output device 920 may be substantially as described above with reference to the output device 620. In some embodiments, the input device 915 may be integrated with the output device 920, for example, as a touchscreen or similar touch-sensitive display. In other embodiments, all or portions of the output device 920 may be located near the input device 915.

As discussed above, the transceiver 925 may communicate with one or more remote units and/or with one or more network functions that provide access to one or more PLMNs. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 may include one or more transmitters 930 and one or more receivers 935. In certain embodiments, the one or more transmitters 930 and/or the one or more receivers 935 may share transceiver hardware and/or circuitry. For example, the one or more transmitters 930 and/or the one or more receivers 935 may share antenna(s), antenna tuner(s), amplifier(s), filter(s), oscillator(s), mixer(s), modulator/demodulator(s), power supply, and the like. In one embodiment, the transceiver 925 implements multiple logical transceivers using different communication protocols or protocol stacks, while using common physical hardware.

Figure 10:
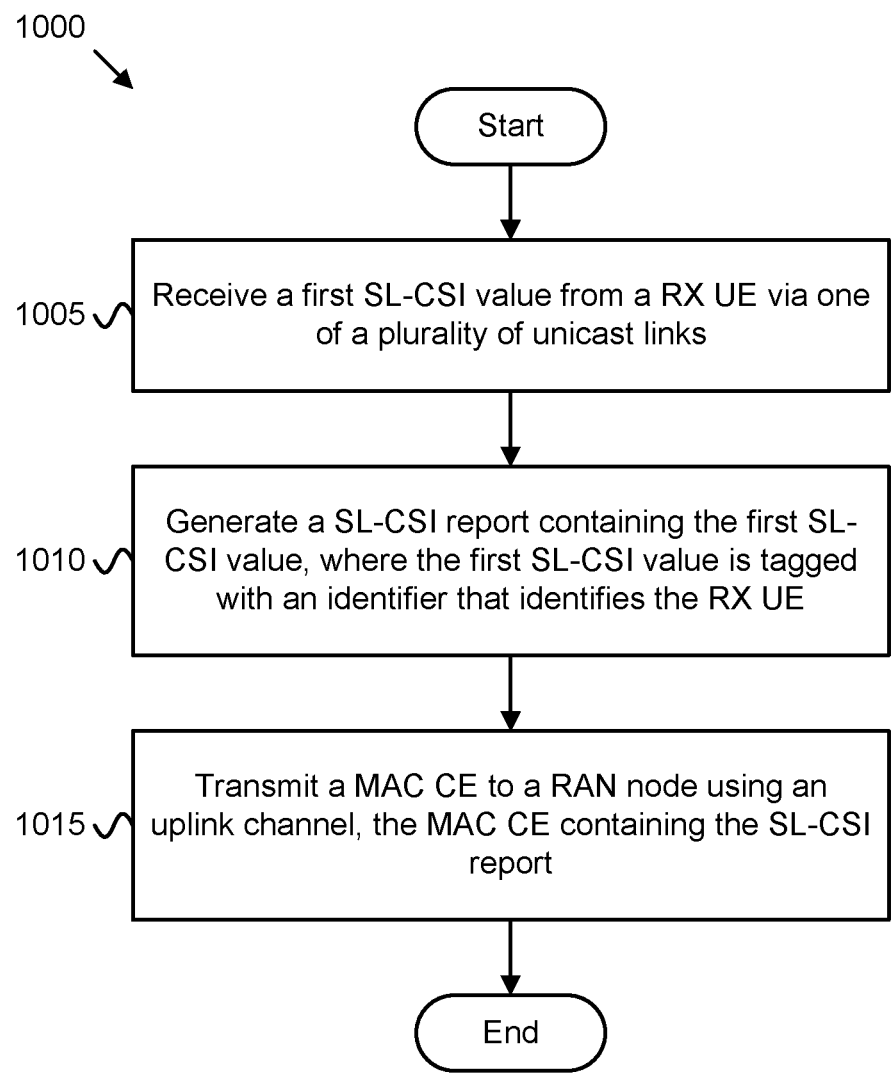
FIG. 10 is a flowchart diagram illustrating one embodiment of a method that may be used for transmitting SL CSI using an uplink channel.

FIG. 10 depicts one embodiment of a method 1000 for transmitting SL CSI using an uplink channel, according to embodiments of the disclosure. In various embodiments, the method 1000 is performed by a TX UE, such as the remote unit 105, the TX UE 201 and/or the user equipment apparatus 800, described above. In some embodiments, the method 1000 is performed by a processor, such as a microcontroller, a microprocessor, a CPU, a GPU, an auxiliary processing unit, a FPGA, or the like.

The method 1000 begins and receives 1005 a first SL-CSI value from a RX UE via one of a plurality of unicast links. The method 1000 includes generating 1010 a SL-CSI report containing the first SL-CSI value, where the first SL-CSI value is tagged with an identifier that identifies the RX UE. The method 1000 includes transmitting 1015 a MAC CE to a RAN node using an uplink channel, the MAC CE containing the SL-CSI report. The method 1000 ends.

Figure 11:
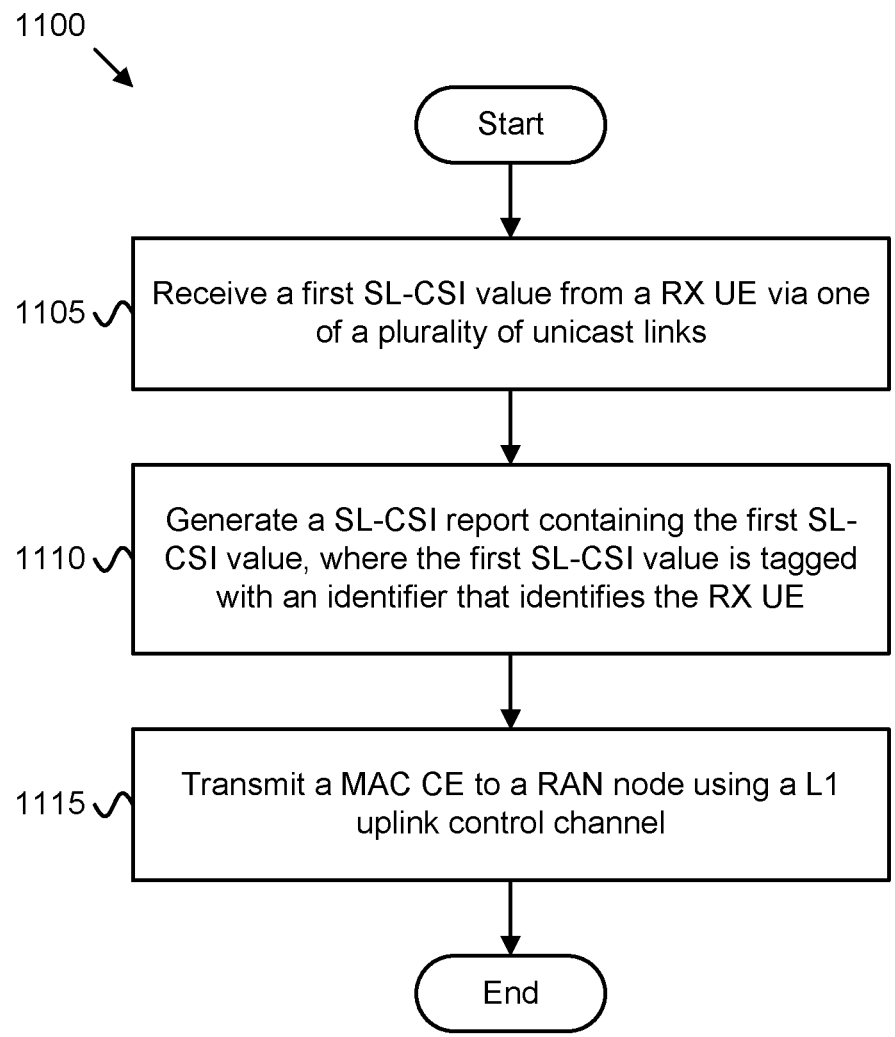
FIG. 11 flowchart diagram illustrating one embodiment of another method that may be used for transmitting SL CSI using an uplink channel.

FIG. 11 depicts one embodiment of a method 1100 for transmitting SL CSI using an uplink channel, according to embodiments of the disclosure. In various embodiments, the method 1100 is performed by a TX UE, such as the remote unit 105, the TX UE 201 and/or the user equipment apparatus 800, described above. In some embodiments, the method 1100 is performed by a processor, such as a microcontroller, a microprocessor, a CPU, a GPU, an auxiliary processing unit, a FPGA, or the like.

The method 1100 begins and receives 1105 a first SL-CSI value from a RX UE via one of a plurality of unicast links. The method 1100 includes generating 1110 a SL-CSI report comprising the first SL-CSI value, wherein the first SL-CSI value is tagged with an identifier that identifies the RX UE. The method 1100 includes transmitting 1115 the SL-CSI report to a radio access network ("RAN") node using a L1 UL control channel. The method 1100 ends.

Disclosed herein is a first apparatus for transmitting SL CSI using an uplink channel, according to embodiments of the disclosure. The first apparatus may be implemented by a TX UE, such as the remote unit 105, the TX UE 201 and/or the user equipment apparatus 800, described above. The first apparatus includes a transceiver that receives a first SL-CSI value from a RX UE via one of a plurality of unicast links. The first apparatus includes a processor that generates a SL-CSI report comprising the first SL-CSI value, wherein the first SL-CSI value is tagged with an identifier that identifies the RX UE. The processor controls the transceiver to transmit a MAC CE to a RAN node using an uplink channel, the MAC CE containing the SL-CSI report.

In some embodiments, generating the SL-CSI report comprises multiplexing a plurality of SL-CSI values from the plurality of unicast links, each SL-CSI value being tagged with a different identifier. In certain embodiments, multiplexing the plurality of SL-CSI values from the plurality of unicast links is based on a latency bound of the SL-CSI values, wherein a second SL-CSI value that exceeds the latency bound is excluded from the SL-CSI report. In one embodiment, the latency bound is signaled via RRC from the RAN node, the latency bound configured as an end-to-end latency bound applicable to both a RX UE-to-TX UE reporting period and a TX UE-to-RAN node reporting period. In another embodiment, the latency bound is signaled via RRC from the RAN node, the latency bound including a first latency bound applicable to a RX UE-to-TX UE reporting period and a second latency bound applicable to a TX UE-to-RAN node reporting period.

In some embodiments, the identifier comprises a link ID that uniquely denotes a source-destination pair between the TX UE and the RX UE. In some embodiments, the identifier comprises a destination ID corresponding to the RX UE. In some embodiments, generating the SL-CSI report comprises multiplexing a plurality of SL-CSI values from multiple carriers and/or bandwidth parts and from multiple panels and/or beams for the same source-destination pair. In some embodiments, the MAC CE further includes an additional field to report one or more of: a SL-CSI measurement configuration, a SL BWP ID, a SL carrier ID, a SL logical panel ID, and a SL Slot number.

In some embodiments, generating the SL-CSI report occurs in response to the TX UE having SL-CSI report pending flag. In such embodiments, the processor clears the flag after the transmission of the MAC CE. In some embodiments, the TX UE operates in a first sidelink mode (i.e., SL Mode-1) corresponding to a network-scheduled sidelink operation. In such embodiments, generating the SL-CSI report includes forming the MAC CE only from one or more SL logical channels configured to transmit SL data using Mode-1.

In some embodiments, the processor triggers a SR transmission to request a PUSCH resource for the transmission of the MAC CE. In some embodiments, the processor controls the transceiver to transmit a SR to request an uplink resource in response to receiving a SL-CSI request from the RAN node in DCI, wherein the SR is transmitted prior to receiving the first SL-CSI value from the RX UE. In some embodiments, the processor controls the transceiver to transmit a SR to request an uplink resource in response to transmitting SCI to the RX UE, said SCI containing a SL-CSI request, wherein the SR is transmitted prior to receiving the first SL-CSI value from the RX UE.

Disclosed herein is a first method for transmitting SL CSI using an uplink channel, according to embodiments of the disclosure. The first method may be performed by a TX UE, such as the remote unit 105, the TX UE 2015 and/or the user equipment apparatus 800, described above. The first method includes receiving a first SL-CSI value from a RX UE via one of a plurality of unicast links and generating a SL-CSI report containing the first SL-CSI value, where the first SL-CSI value is tagged with an identifier that identifies the RX UE. The first method includes transmitting a MAC CE to a RAN node using an uplink channel, the MAC CE containing the SL-CSI report.

In some embodiments, generating the SL-CSI report comprises multiplexing a plurality of SL-CSI values from the plurality of unicast links, each SL-CSI value being tagged with a different identifier. In certain embodiments, multiplexing the plurality of SL-CSI values from the plurality of unicast links is based on a latency bound of the SL-CSI values, wherein a second SL-CSI value that exceeds the latency bound is excluded from the SL-CSI report. In one embodiment, the latency bound is signaled via RRC from the RAN node, the latency bound configured as an end-to-end latency bound applicable to both a RX UE-to-TX UE reporting period and a TX UE-to-RAN node reporting period. In another embodiment, the latency bound is signaled via RRC from the RAN node, the latency bound including a first latency bound applicable to a RX UE-to-TX UE reporting period and a second latency bound applicable to a TX UE-to-RAN node reporting period.

In some embodiments, the identifier comprises a link ID that uniquely denotes a source-destination pair between the TX UE and the RX UE. In some embodiments, the identifier comprises a destination ID corresponding to the RX UE. In some embodiments, generating the SL-CSI report comprises multiplexing a plurality of SL-CSI values from multiple carriers and/or bandwidth parts and from multiple panels and/or beams for the same source-destination pair. In some embodiments, the MAC CE further includes an additional field to report one or more of: a SL-CSI measurement configuration, a SL BWP ID, a SL carrier ID, a SL logical panel ID, and a SL Slot number.

In some embodiments, generating the SL-CSI report occurs in response to the TX UE having SL-CSI report pending flag. In such embodiments, the first method further includes clearing the flag after the transmission of the MAC CE. In some embodiments, the TX UE operates in a first sidelink mode (i.e., SL Mode-1) corresponding to a network-scheduled sidelink operation. In such embodiments, generating the SL-CSI report includes forming the MAC CE only from one or more SL logical channels configured to transmit SL data using Mode-1.

In some embodiments, the first method includes triggering a SR transmission to request a PUSCH resource for the transmission of the MAC CE. In some embodiments, the first method includes transmitting a SR to request an uplink resource in response to receiving a SL-CSI request from the RAN node in DCI, wherein the SR is transmitted prior to receiving the first SL-CSI value from the RX UE. In some embodiments, the first method includes transmitting a SR to request an uplink resource in response to transmitting SCI to the RX UE, said SCI containing a SL-CSI request, wherein the SR is transmitted prior to receiving the first SL-CSI value from the RX UE.

Disclosed herein is a second apparatus for transmitting SL CSI using an uplink channel, according to embodiments of the disclosure. The second apparatus may be implemented by a TX UE, such as the remote unit 105, the TX UE 201 and/or the user equipment apparatus 800, described above. The second apparatus includes a transceiver that receives a first SL-CSI value from a RX UE via one of a plurality of unicast links. The second apparatus includes a processor that generates a SL-CSI report comprising the first SL-CSI value, where the first SL-CSI value is tagged with an identifier that identifies the RX UE. The processor controls the transceiver to transmit the SL-CSI report to a RAN node using a L1 UL control channel.

In some embodiments, the L1 UL control channel is a PUCCH. In such embodiments, the transceiver receives DCI, the DCI carrying time and frequency information for the PUCCH carrying the SL-CSI report, where transmitting the SL-CSI report comprises a PUCCH transmission. In certain embodiments, the timing information in DCI comprises a parameter 'k' that defines a number of slots between the DCI reception and the PUCCH transmission.

In some embodiments, the processor controls the transceiver to transmit SCI to the RX UE, said SCI containing a SL-CSI request, where the RX UE transmits the first SL-CSI value in response to the SL-CSI request. In such embodiments, the timing information in DCI comprises a parameter 'k' that defines a number of slots between the SCI transmission and the PUCCH transmission.

In some embodiments, generating the SL-CSI report comprises multiplexing a plurality of SL-CSI values from the plurality of unicast links, each SL-CSI value being tagged with a different identifier. In some embodiments, the L1 UL control channel transmission comprises an additional field to report one or more of: a SL-CSI measurement configuration, a SL BWP ID, a SL carrier ID, a SL logical panel ID, and a SL Slot number.

In some embodiments, the identifier comprises a destination ID corresponding to the RX UE. In some embodiments, the identifier comprises a link ID that uniquely denotes a source-destination pair between the TX UE and the RX UE. In some embodiments, generating the SL-CSI report comprises multiplexing a plurality of SL-CSI values from multiple carriers and/or bandwidth parts and from multiple panels and/or beams for the same source-destination pair.

Disclosed herein is a second method for transmitting SL CSI using an uplink channel, according to embodiments of the disclosure. The second method may be performed by a TX UE, such as the remote unit 105, the TX UE 201 and/or the user equipment apparatus 800, described above. The second method includes receiving a first SL-CSI value from a RX UE via one of a plurality of unicast links and generating a SL-CSI report comprising the first SL-CSI value, where the first SL-CSI value is tagged with an identifier that identifies the RX UE. The second method includes transmitting the SL-CSI report to a RAN node using a L1 UL control channel.

In some embodiments, the L1 UL control channel is a PUCCH. In such embodiments, the second method includes receiving DCI, the DCI carrying time and frequency information for the PUCCH carrying the SL-CSI report, where transmitting the SL-CSI report comprises a PUCCH transmission. In certain embodiments, the timing information in DCI comprises a parameter 'k' that defines a number of slots between the DCI reception and the PUCCH transmission.

In some embodiments, the second method includes transmitting SCI to the RX UE, said SCI containing a SL-CSI request, where the RX UE transmits the first SL-CSI value in response to the SL-CSI request. In such embodiments, the timing information in DCI comprises a parameter 'k' that defines a number of slots between the SCI transmission and the PUCCH transmission.

In some embodiments, generating the SL-CSI report comprises multiplexing a plurality of SL-CSI values from the plurality of unicast links, each SL-CSI value being tagged with a different identifier. In some embodiments, the L1 UL control channel transmission comprises an additional field to report one or more of: a SL-CSI measurement configuration, a SL BWP ID, a SL carrier ID, a SL logical panel ID, and a SL Slot number.

In some embodiments, the identifier comprises a destination ID corresponding to the RX UE. In some embodiments, the identifier comprises a link ID that uniquely denotes a source-destination pair between the TX UE and the RX UE. In some embodiments, generating the SL-CSI report comprises multiplexing a plurality of SL-CSI values from multiple carriers and/or bandwidth parts and from multiple panels and/or beams for the same source-destination pair.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a transmitting user equipment ("TX UE") comprising:

receiving a first sidelink channel state information ("SL-CSI") value from a receiving user equipment ("RX UE") via one of a plurality of unicast links;
generating a SL-CSI report comprising the first SL-CSI value, wherein the first SL-CSI value is tagged with an identifier that identifies the RX UE; and
transmitting a Medium Access Control Control Element ("MAC CE") to a radio access network ("RAN") node using an uplink channel, the MAC CE containing the SL-CSI report.

2. The method of claim 1, wherein generating the SL-CSI report comprises multiplexing a plurality of SL-CSI values from the plurality of unicast links, each SL-CSI value being tagged with a different identifier.

3. The method of claim 2, wherein multiplexing the plurality of SL-CSI values from the plurality of unicast links is based on a latency bound of the SL-CSI values, wherein a second SL-CSI value that exceeds the latency bound is excluded from the SL-CSI report.

4. The method of claim 3, wherein the latency bound is signaled via RRC from the RAN node, the latency bound configured as an end-to-end latency bound applicable to both a RX UE-to-TX UE reporting period and a TX UE-to-RAN node reporting period.

5. The method of claim 3, wherein the latency bound is signaled via RRC from the RAN node, the latency bound including a first latency bound applicable to a RX UE-to-TX UE reporting period and a second latency bound applicable to a TX UE-to-RAN node reporting period.

6. The method of claim 1, wherein the identifier comprises a link ID that uniquely denotes a source-destination pair between the TX UE and the RX UE.

7. The method of claim 1, wherein generating the SL-CSI report comprises multiplexing a plurality of SL-CSI values from multiple carriers and/or bandwidth parts and from multiple panels and/or beams for the same source-destination pair.

8. The method of claim 1, wherein the identifier comprises a destination ID corresponding to the RX UE.

9. The method of claim 1, wherein the MAC CE further includes an additional field to report one or more of: a SL-CSI measurement configuration, a sidelink ("SL") bandwidth part ("BWP") ID, a SL carrier ID, a SL logical panel ID, and a SL Slot number.

10. The method of claim 1, wherein generating the SL-CSI report occurs in response to the TX UE having SL CSI report pending flag, the method further comprising clearing the flag after the transmission of the MAC CE.

11. The method of claim 1, wherein the TX UE operates in a first sidelink mode ("SL Mode-1") corresponding to a network-scheduled sidelink operation, wherein generating the SL-CSI report further comprises forming the MAC CE only from one or more sidelink ("SL") logical channels configured to transmit SL data using Mode-1.

12. The method of claim 1, further comprising triggering a scheduling request ("SR") transmission to request a PUSCH resource for the transmission of the MAC CE.

13. The method of claim 1, further comprising transmitting a scheduling request ("SR") to request an uplink resource in response to receiving a SL-CSI request from the RAN node in downlink control information ("DCI"), wherein the SR is transmitted prior to receiving the first SL-CSI value from the RX UE.

14. The method of claim 1, further comprising transmitting a scheduling request ("SR") to request an uplink resource in response to transmitting sidelink control information ("SCI") to the RX UE, said SCI containing a SL-CSI request, wherein the SR is transmitted prior to receiving the first SL-CSI value from the RX UE.

15. A method of a transmitting user equipment ("TX UE") comprising:
receiving a first sidelink channel state information ("SL-CSI") value from a receiving user equipment ("RX UE") via one of a plurality of unicast links;
generating a SL-CSI report comprising the first SL-CSI value, wherein the first SL-CSI value is tagged with an identifier that identifies the RX UE; and
transmitting the SL-CSI report to a radio access network ("RAN") node using a Layer-1 uplink control channel.

16. The method of claim 15, wherein the Layer-1 uplink control channel is a physical uplink control channel ("PUCCH"), the method further comprising:
receiving downlink control information ("DCI"), the DCI carrying time and frequency information for the PUCCH carrying the SL-CSI report, wherein transmitting the SL-CSI report comprises a PUCCH transmission.

17. The method of claim 16, wherein the timing information in DCI comprises a parameter 'k' that defines a number of slots between the DCI reception and the PUCCH transmission.

18. The method of claim 16, further comprising:
transmitting sidelink control information ("SCI") to the RX UE, said SCI containing a SL-CSI request,
wherein the RX UE transmits the first SL-CSI value in response to the SL-CSI request,
wherein the timing information in DCI comprises a parameter 'k' that defines a number of slots between the SCI transmission and the PUCCH transmission.

19. A transmitting user equipment ("TX UE") apparatus comprising:
a transceiver that receives a first sidelink channel state information ("SL-CSI") value from a receiving user equipment ("RX UE") via one of a plurality of unicast links; and
a processor that
generates a SL-CSI report comprising the first SL-CSI value, wherein the first SL-CSI value is tagged with an identifier that identifies the RX UE; and
transmits a Medium Access Control Control Element ("MAC CE") to a radio access network ("RAN") node using an uplink channel, the MAC CE containing the SL-CSI report.

\* \* \* \* \*